US005844021A

United States Patent [19]
Koblitz et al.

[11] Patent Number: 5,844,021
[45] Date of Patent: *Dec. 1, 1998

[54] SEALANT COMPOSITIONS AND SEALED ELECTRICAL CONNECTORS

[75] Inventors: Francis Frederick Koblitz, York; Ricky Charles Mellinger, Seven Valleys; Thomas John Lynch, Mechanicsburg; Gregory T. Pawlikowski, Stewartstown, all of Pa.

[73] Assignee: The Whitaker Corporation, Wilmington, Del.

[ * ] Notice: The term of this patent shall not extend beyond the expiration date of Pat. No. 5,544,463.

[21] Appl. No.: 438,835

[22] Filed: May 11, 1995

Related U.S. Application Data

[63] Continuation-in-part of Ser. No. 297,574, Aug. 29, 1994, Pat. No. 5,544,463, which is a continuation of Ser. No. 878,807, May 5, 1992, Pat. No. 5,360,350, which is a continuation-in-part of Ser. No. 749,373, Aug. 23, 1991, Pat. No. 5,354,210.

[51] Int. Cl.$^6$ .............................. H01R 13/52; H01B 3/44
[52] U.S. Cl. ..................... 523/173; 439/276; 439/936; 524/476; 524/505; 524/507; 525/89; 525/95; 525/903; 252/570
[58] Field of Search ..................................... 439/276, 936; 523/173; 524/505, 507, 476; 252/570; 525/89, 903, 95

[56] References Cited

U.S. PATENT DOCUMENTS

| | | | |
|---|---|---|---|
| Re. 33,354 | 9/1990 | Downey et al. | 428/375 |
| 2,906,810 | 9/1959 | D'Ascoli et al. | 174/87 |
| 3,020,260 | 8/1962 | Nelson | 260/46.5 |
| 3,239,478 | 3/1966 | Harlan, Jr. | 260/27 |
| 3,265,765 | 8/1966 | Holden et al. | 260/876 |
| 3,410,950 | 11/1968 | Freudenberg | 174/84 |
| 3,485,787 | 12/1969 | Haefele et al. | 260/33.6 |
| 3,522,576 | 8/1970 | Cairns | 339/96 |
| 3,536,626 | 10/1970 | D'Ascoli et al. | 252/64 |
| 3,539,708 | 11/1970 | D'Ascoli et al. | 174/87 |
| 3,676,387 | 7/1972 | Lindlof | 260/28.5 B |
| 3,784,952 | 1/1974 | Murray | 339/12 V |
| 3,827,999 | 8/1974 | Crossland | 260/33.6 AQ |
| 3,879,575 | 4/1975 | Dobbin et al. | 174/92 |
| 3,897,129 | 7/1975 | Farrar, Jr. | 339/116 |
| 4,041,103 | 8/1977 | Davison et al. | 260/857 D |
| 4,087,585 | 5/1978 | Schulz | 428/429 |
| 4,101,605 | 7/1978 | Gergen et al. | 268/873 |
| 4,102,716 | 7/1978 | Groves et al. | 156/48 |
| 4,171,998 | 10/1979 | Brauer et al. | 156/48 |
| 4,369,284 | 1/1983 | Chen | 524/476 |
| 4,375,521 | 3/1983 | Arnold | 523/173 |
| 4,425,017 | 1/1984 | Chan | 339/96 |
| 4,451,696 | 5/1984 | Beinhaur | 174/92 |
| 4,514,588 | 4/1985 | Beever et al. | 524/505 |
| 4,595,635 | 6/1986 | Dubrow et al. | 428/447 |
| 4,600,261 | 7/1986 | Debbaut | 339/116 |
| 4,634,207 | 1/1987 | Debbaut | 339/116 |

(List continued on next page.)

FOREIGN PATENT DOCUMENTS

| | | |
|---|---|---|
| 0 058 022 | 8/1982 | European Pat. Off. . |
| 0 074 714 | 3/1983 | European Pat. Off. . |
| 0 371 641 | 6/1990 | European Pat. Off. . |
| 25 19 018 | 11/1976 | Germany . |
| 2021612 | 12/1979 | United Kingdom . |
| 2195642 | 4/1988 | United Kingdom . |

OTHER PUBLICATIONS

K.B. Wagener and L.P. Engle, Thermally Reversible Polymer Linkages III. Covalently Crosslinked Poly(Aslactone), Polymer Preprints, vol. 32, No. 1, Apr. 1991.

C. G. Varelas et al., Microdomain Composition in Two Phase Hydrogels, Polymer Preprints, vol. 32, No. 1, Apr. 1991.

Klein Rodrigues and Wayne L. Mattice, Simulation of Diblock CoPolymers as Steric Stabilizers of Polymer Colloids, Polymer Preprints, vol. 32, No. 1, Apr. 1991.

Loon–Seng Tan and Fred E. Arnold, In–Situ Molecular Composites II: Synthesis and Characterization of Poly (Amic Dialkylamides) . . . Polymer Preprints, vol. 32, No. 1, Apr. 1991.

Painter et al., The Formulation of Molecular Composites through Hydrogen Bonding Interactions, Polymer Preprints, vol. 32, No. 1, Apr. 1991.

Quiet Comes to Florida, Outside Plant Magazine, copyright 1990, Practical Communications Inc.

Bruce Malloy et al., Terminal Protection: New Technology Is Beginning to Gel, TE&M, Apr. 15, 1989.

Paul S. Russo, Reversible Polymeric Gels and Related Systems, 191st Meeting of the American Chemical Society, Apr. 13–18, 1986.

D. R. Hansen and Geoff Holden, Thermoplastic Elastomers, Modern Plastics Encyclopedia, 1985–86.

H.F. Giles, Jr., Alloys and Blends, Modern Plastics Encyclopedia, 1985–86.

AMP Instruction Sheet, IS 9616, released Apr. 27, 1990.

AMP Product Information Sheet, Catalog 90–923, issued Apr. 1990.

AMP Instruction Sheet, IS 3206, released Mar. 9, 1990.

AMP Instruction Sheet 3217, released Dec. 20, 1989.

Generic Requires for Terminal Blocks, Bellcore Technical Advisory TA–TSY–000975, Issue 1, Sep. 1989.

*Primary Examiner*—Andrew E. C. Merriam

[57] ABSTRACT

Disclosed are sealant compositions and electrical connectors having excellent low temperature repairability and outstanding sealing ability at both high and low temperatures. The preferred connectors contain a sealant composition comprising an elastomeric thermoplastic polymer and an extender for said polymer, said extender constituting a major proportion by weight of said sealant composition and said polymer constituting a minor proportion by weight of said sealant composition, wherein said composition preferably has a low-temperature wire insertability of at least about 80 mm. Furthermore, the preferred compositions are both slump and spew resistant over the operating temperature range of the connector.

22 Claims, 8 Drawing Sheets

U.S. PATENT DOCUMENTS

| | | | |
|---|---|---|---|
| 4,643,924 | 2/1987 | Uken et al. | 428/35 |
| 4,690,831 | 9/1987 | Uken et al. | 427/44 |
| 4,701,016 | 10/1987 | Gartside, III et al. | 350/96.23 |
| 4,705,340 | 11/1987 | Loose | 439/395 |
| 4,714,801 | 12/1987 | Koblitz et al. | 178/88 |
| 4,716,183 | 12/1987 | Gamarra et al. | 522/80 |
| 4,721,832 | 1/1988 | Toy | 174/87 |
| 4,798,853 | 1/1989 | Handlin, Jr. | 523/173 |
| 4,833,193 | 5/1989 | Sievering | 524/486 |
| 4,864,725 | 9/1989 | Debbaut | 29/871 |
| 4,865,905 | 9/1989 | Uken | 428/220 |
| 4,883,431 | 11/1989 | Uken et al. | 439/521 |
| 4,909,756 | 3/1990 | Jervis | 439/521 |
| 4,942,270 | 7/1990 | Gamarrra | 174/93 |
| 4,998,894 | 3/1991 | Gronvall | 439/521 |
| 5,004,869 | 4/1991 | Koblitz et al. | 174/84 |
| 5,006,077 | 4/1991 | Loose et al. | 439/409 |
| 5,069,636 | 12/1991 | Shimirak et al. | 439/411 |
| 5,083,940 | 1/1992 | Larson et al. | 439/521 |
| 5,262,468 | 11/1993 | Chen | 524/476 |
| 5,278,220 | 1/1994 | Vermeire et al. | 524/490 |
| 5,313,019 | 5/1994 | Brusselmans et al. | 174/93 |
| 5,334,646 | 8/1994 | Chen | 525/95 |
| 5,357,057 | 10/1994 | Debbaut | 174/76 |
| 5,360,350 | 11/1994 | Koblitz et al. | 524/505 |

OTHER PUBLICATIONS

Information About High Technology Silicone Materials, Dow Corning Information Sheet, copyright 1983.
Information About Silicone Elastomers, Dow Corning Information Sheet, copyright 1980.
Bellcore Technical Reference, TR–NWT–000975, Issue 1, Generic Requirements for Unportected Terminal Blocks, May 1991.
Bellcore Technical Advisory, TA–TSY–000975, Issue 1, Generic Requirements for Terminal Blocks, Sep. 1989.
Union Carbide, OrganoSilicon Product Information, Organofunctional Silane A–13, SC–1592A, 1991.
Exxon Chemical, Isopar Solvents Offer Extraordinary Versatility for Many Uses, 20013/91.
3M Instruction Bulletin, MS$^{2tm}$ Super Mate 4005–CBM Encapsulated Bridge Module, Issue 2, Jan. 1990.
Macromolecules, Advance ACS Abstracts, vol. 2, No. 17, p. 174, Sep. 1, 1994.
Macromolecules, Advance ACS Abstracts, vol. 2, No. 17, p. 165, Sep. 1, 1994.
Macromolecules, Advance ACS Abstracts, vol. 2, No. 17, p. 172, Sep. 1, 1994.
Tentative Technical Data Sheet for AMP Corporate Bulletin No. 401–69B, AMP Sealant 19, Revised Nov. 4, 1994.
Amoco Chemical Company, What is Panalane?, D0592, Bulletin HB–5, 1992.
M.K. Mishra and R.G. Saxton, Polymer Additives for Engine Oils, Chemtech, Apr. 1995.
E.R. Booser, Lubrication and Lubricants, Concise Encyclopedia of Chemical Technology, 1985.
Stanley K. Baczek and William B. Chamberlin, Petroleum Additives, Concise Encyclopedia of Polymer Science and Engineering, 1990.
(AMP Ref. 38) Exxon Product Information Bulletin, Isopar G Sales Specifications, DG–1P, Aug. 27, 1989.
(AMP Ref. 37) EXXON, ISOPAR, Lubetext DG–1P, Jan. 31, 1983.
Standard Test Method for Low–Temperature Viscosity of Automotive Fluid Lubricants Measured by Brookfield Viscometer, ASTM Designation D 2983–80, Oct. 1980.
Standard Test Method for Kinematic Viscosity of Transparent and Opaque Liquids (and the Calculation of Dynamic Viscosity), ASTM Designation D 445–83, Jan. 1984.
Allied, A–C Polyethylene World's Most Complete Line of Polyethylene Waxes, Gen 1021.85, 1985.
Gardner's Chemical Synonyms and Trade Names, 10th ed., 1994.
(AMP Ref. 35) Mark C. Bricker and Stuart T. Gentry, Raw Materials, Tackifiers and VAA Adhesives: New Tools for the Packaging Industry, Adhesives Age, Jul. 1994.
(AMP Ref. 34) AMP Quiet Front Single–Pair Cross Connect Modules, Instruction Sheet 408–3311, Mar. 10, 1994.
Standard Practice for Calculating Viscosity Index From Kinematic Viscosity at 40° and 100° C., ASTM Designation D 2270–93, May 1993.
Rohm and Haas, ACRYLOID 950 Series Multifunctional VI Improvers, Acryloid 954 & 956, PC–58b, Oct. 1994.
Rohm and Haas, Product Specifications, Acryloid 954, Nov. 4, 1994.
Uniroyal Chemical Company, Specialty Chemicals, Synton PAO–100, DN168S RL, 1988.
Uniroyal Chemical Company, Specialty Chemicals, Synton PAO–40, DN178S RL, 1988.
Texaco Additive Company, Technical Bulletin, TLA–6723 Olefin Copolymer VI Improver, TB–115, Feb. 22, 1993.
Standard Test Methods for Shear Stability of Polymer–Containing Fluids Using a Diesel Injector Nozzle, ASTM Designation: D 3945–93, Aug. 1993.
Standard Test Method for Evaporation Loss of Lubricating Greases and Oils, ASTM Designation: D 972–91, Nov. 1991.
Standard Test Method for Weight Loss of Plasticizers on Heating, ASTM Designation: D 2288–92, Dec. 1992.
Abstract of U.S. Patent No. 5,412,022, Lyo Gel, Its Production and Its Use for Sealing, U.S. issue date May 2, 1995, PCT publication date Jun. 25, 1992.
Shell Chemical Company, SC 2278–95, Kraton Polymers for Adhesive and Sealants, Stable, Strong, Reactive, Soft, Versatile. Kraton G Gives You the Right to Be Choosy, vol. 1, No. 2, 1995.
Patrick A. Toensmeier, TPE Formulations Show New Versatility, Modern Plastics, May 1995.
Jacob Abboud, The Hyperplastic–Viscoelastic Modelling of Raychem Sealing Gels, Abaqus User Conference Jun. 1–3, 1994.

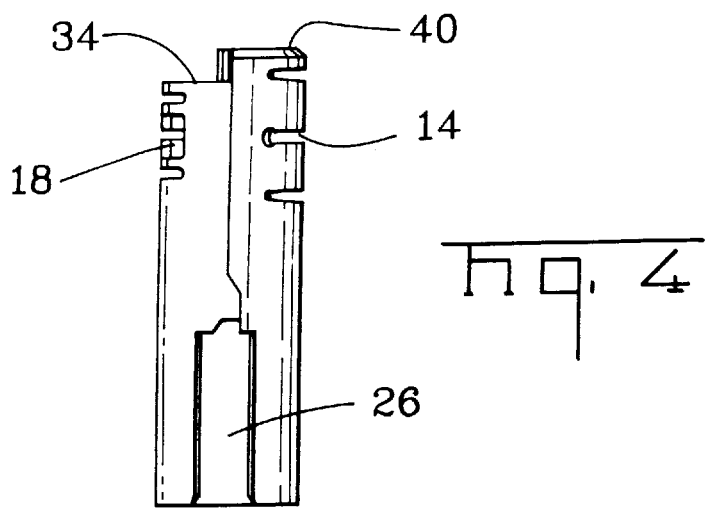
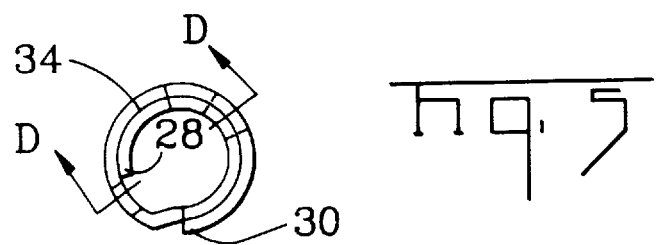
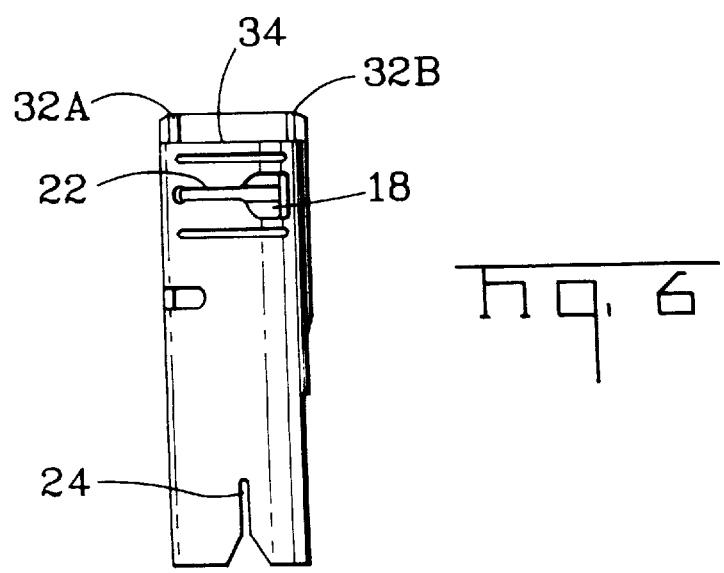

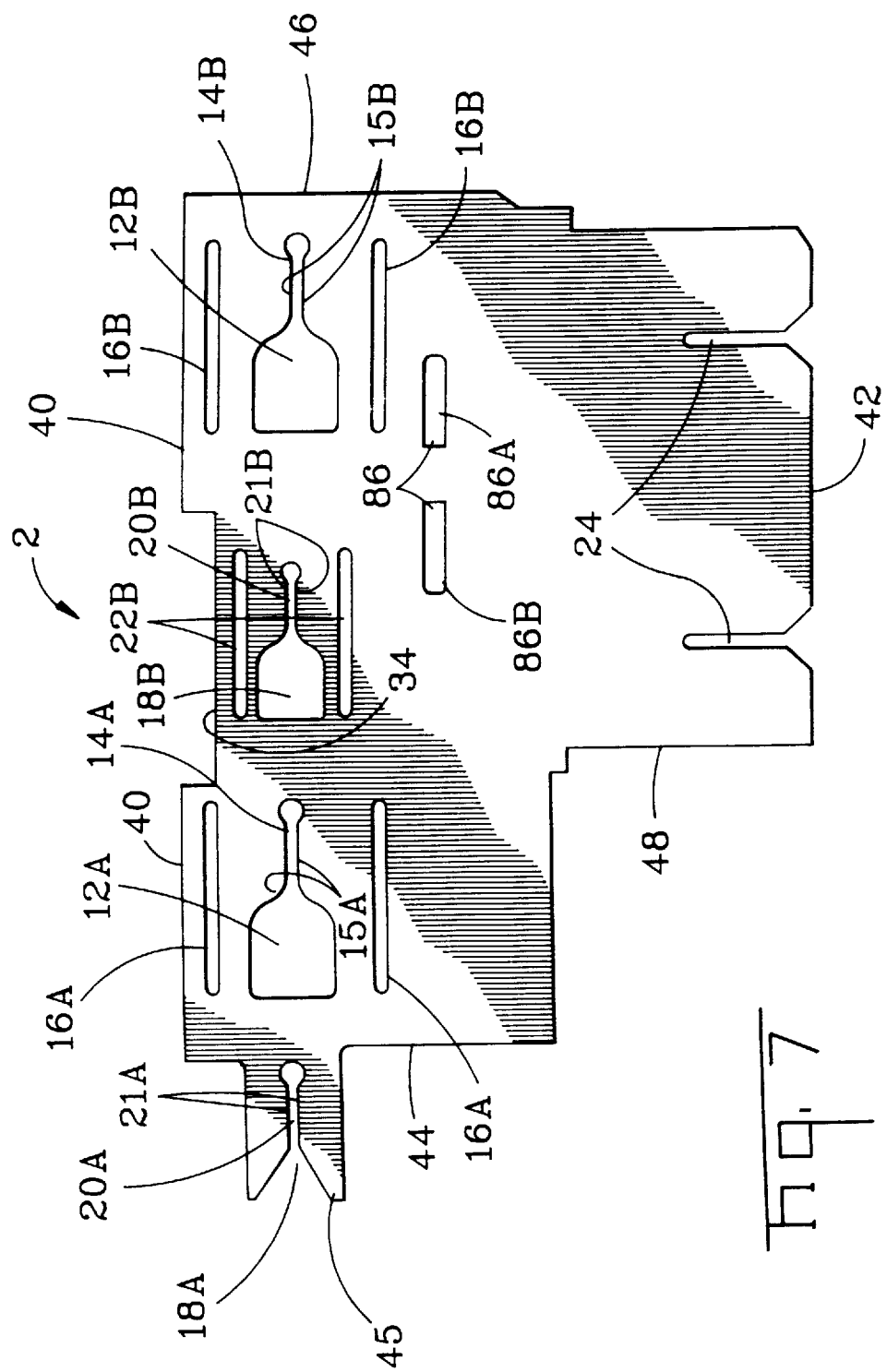

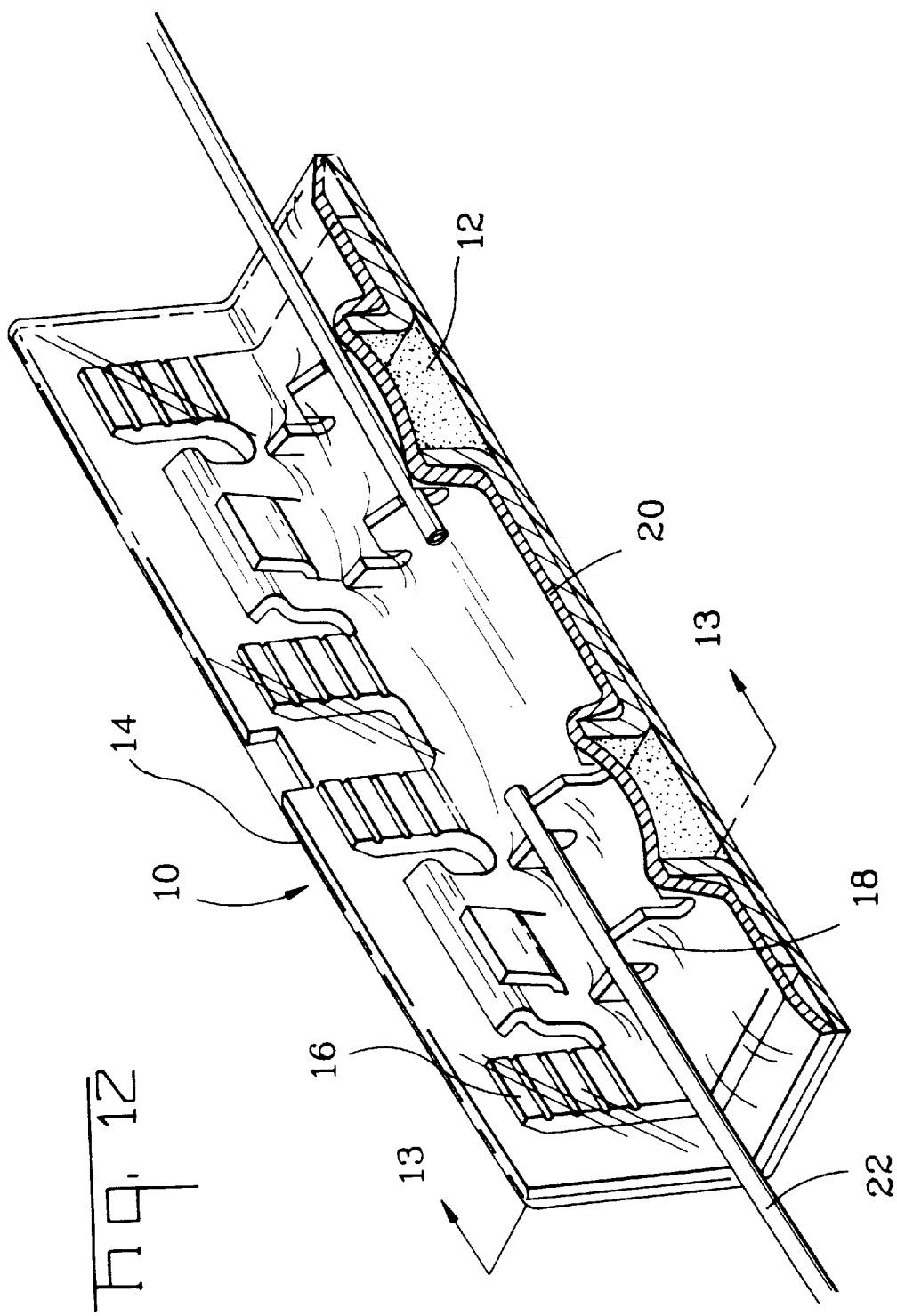

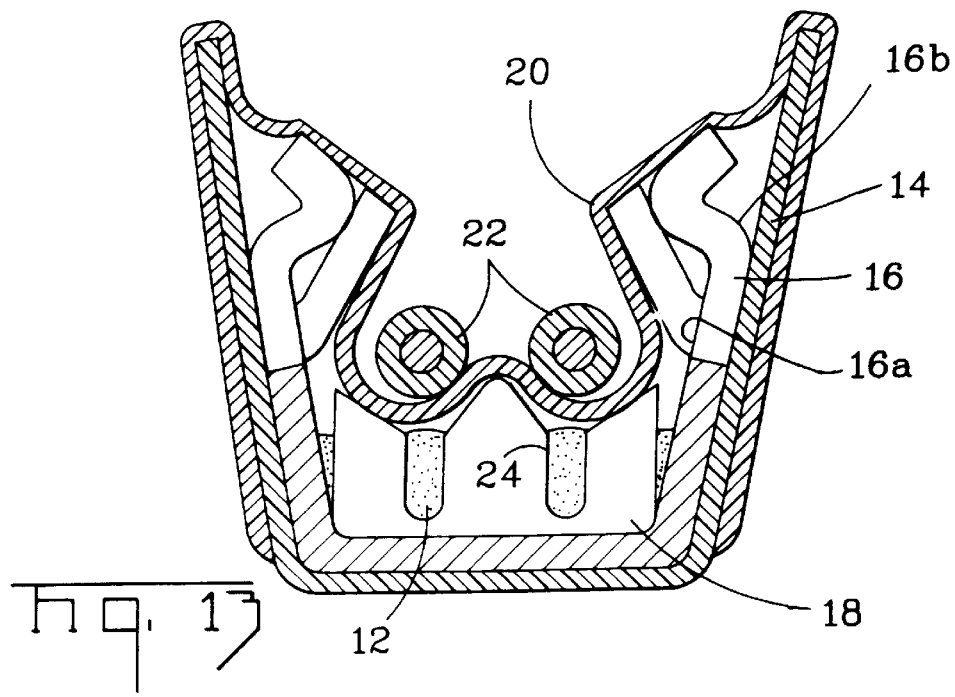
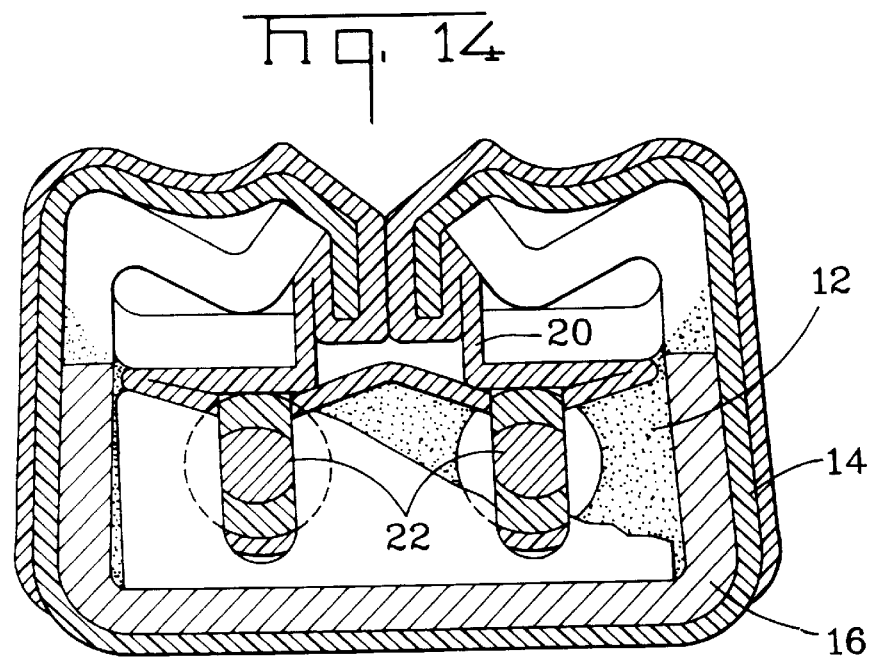

5,844,021

SEALANT COMPOSITIONS AND SEALED ELECTRICAL CONNECTORS

This application is a continuation-in-part of copending application Ser. No. 08/297,574, filed Aug. 29, 1994, now U.S. Pat. No. 5,544,463 which in turn is a continuation of application Ser. No. 07/878,807, filed May 5, 1992, now U.S. Pat. No. 5,360,350, which in turn was a continuation-in-part of application Ser. No. 07/749,373, filed Aug. 23, 1991, now U.S. Pat. No. 5,354,210.

U.S. Pat. Nos. 5,360,350 and 5,354,210 are each incorporated herein by reference.

FIELD OF THE INVENTION

The present invention relates to the field of electrical connectors, compositions for sealing electrical connectors, and methods of making such compositions and connectors.

Quality and durability are important factors in the design of systems for providing electrical connections, especially such systems utilized in the telecommunications and automotive industries. It is also desirable that electrical connections possess the ability to remain in a moisture free, non-corrosive environment when subjected to externally applied shock, vibration and temperature stresses.

While noise resistance, durability and moisture resistance in the face of environmental variations and other stresses is desirable in nearly all electrical connecting devices, there are also many commercial and military applications which require that electrical connections be reused, repaired and/or modified in the field. It is highly desirable that such reuse, repair and/or modification be accomplished in the shortest period of time, in an economically efficient fashion and with a minimum of inconvenience to the field craftsperson or technician. One aspect of this field repairability involves the fact that such reuses and repairs must often be made under extreme environmental conditions, including both very high and very low temperatures, as specified, for example, in Bellcore (Bell Communications Research) Technical Reference TR-NWT-000975, Issue 1, May 1991, which is incorporated herein by reference.

REPORTED DEVELOPMENTS

Many prior patents have sought to address the needs of electrical connectors and connector sealants. One such patent is U.S. Pat. No. 5,354,210 (the '210 patent), which is assigned to the assignee of the present invention and which is directed to the use of polymer-based compositions to seal electrical connections. Although the connectors and sealants disclosed in the '210 patent have achieved a significant degree of success, disadvantages have been noted for certain of the connectors disclosed therein. An especially troublesome difficulty is that certain of the disclosed connectors exhibit poor repairability at low temperature, which applicants have recognized to arise in part from the tendency of certain sealants to become hard and tacky at low temperatures. For example, reinsertion of the wires into the such connectors becomes extremely difficult, if not impossible, at temperatures as low as about −20° C. In addition, when wires are removed from such connectors at low temperatures, certain of the sealants disclosed in the '210 patent exhibit a tendency to shred, tear, or otherwise be removed from the connector body. As a result, these connectors can suffer from the disadvantage of being time consuming and inconvenient to repair in low temperature environments.

U.K. Patent Application 2,195,642 A also reports the use of polymer-based compositions to seal electrical connections. However, the sealants and connectors disclosed in this reference have been tested by applicants, and the low temperature properties of this material are significantly more disadvantageous than the properties exhibited by certain of the sealants in the '210 patent.

SUMMARY OF THE INVENTION

Applicants have discovered electrical connectors and splices having excellent low temperature repairability and outstanding sealing ability at both high and low temperatures. The preferred connectors contain a sealant composition comprising an elastomeric thermoplastic polymer and an extender for said polymer, said extender comprising a major proportion by weight of said sealant composition and said polymer comprising a minor proportion by weight of said sealant composition, wherein said composition has a low-temperature wire insertability of greater than about 100, as defined hereinafter. Furthermore, the preferred compositions are both slump and spew resistant over the operating temperature range of the connector. As used herein, the operating temperature range refers to the range of temperatures over which the connector is expected to function within specified parameters. For many of the preferred embodiments, the operating temperature range is from about −40° C. to about 60° C., as specified in Bellcore TR-NWT-000975.

In yet further embodiments, it is also preferred that the sealant compositions be flowable at temperatures above about the operating temperature range. The term "flowable" is used to refer to the thermoplasticity, extrudability, injectability or pourability of the compositions of the present invention. It should be noted that the present compositions are preferably simultaneously slump and spew resistant over the operating temperature range while being flowable at the elevated temperatures. Applicants have found that such a combination of features is highly beneficial from the standpoint of both manufacturing techniques and operability.

The ability of the present sealant compositions to resist slumping and spewing at the upper end of the operating temperature range has obvious advantages in connecting devices adapted for elevated temperature service, such as is frequently required in automotive applications. However, it is thoroughly unexpected that such a property is capable of coexisting in a sealant which also has the processing advantage of being flowable at moderately elevated temperatures while also possessing excellent low temperature repairability. Applicants have achieved this surprising result by providing compositions having a carefully selected, synergistic combination of components.

Because of the unique combination of properties described above, the compositions of the present invention are especially well suited to field repair of electrical connectors and connector housings. For example, it is contemplated that the present invention will have benefit in telecommunications applications such as cross connect terminals and terminal blocks, crimpalble preinsulated connectors, s buried service splices, solar panel connectors, aerial drop wire connectors, cable TV connectors, modular connectors such as AMP® Stack brand connectors, and AMP® Tel-Splice type connectors. It is also contemplated that the sealants of the present invention may also be used to advantage in other than connector applications, such as telephone cable filling applications.

The resistance of the present compositions to spewing and slumping means that the compositions remain in the connector even at the upper end of the operating temperature range. Surprisingly, however, and despite the excellent slump and spew resistance at the upper end of the operating temperature range, the present compositions are nevertheless flowable at moderately elevated temperatures. These properties advantageously permit, for example, the compositions to be injected by a syringe or similar apparatus into sealed connectors through the wire entry/exit holes of the connectors. The injectability of the present compositions eliminates the need to open a connector to add new material as required in many prior art sealant compositions. Remarkably, the preferred compositions of the present invention also possess a softness, lubricity and wire insertability at low temperatures which is exceptional for any sealant, and which is truly outstanding for a sealant having the high temperature spew and slump resistance of the present sealants.

The preferred compositions of the present invention also have an ability to bond, seal and insulate electrical contacts and connector housings, while simultaneously having a highly desirable balance of cohesive strength and adhesive strength. Electrical connectors containing such materials offer the possibility of being both effective and reusable.

Applicants have found that the adhesive strength of the preferred compositions provides a strong temperature and water-resistant seal while the cohesive strength thereof ensures that the composition will remain in the connector when terminated wires or test probes are removed. Furthermore, the substantial elastic memory and self-bonding of the preferred compositions result in substantially no voids being left in a mass of the composition when the wire or test probe is removed, even at low temperatures. Thus, applicants have discovered compositions and connectors which eliminate or substantially reduce the problems and disadvantages associated with the above-noted materials and devices.

An important aspect of certain embodiments of the present compositions resides in the particular thermoplastic elastomer used. Preferably the elastomeric thermoplastic polymer comprises a composite of primary and secondary elastomeric thermoplastic polymers. For the purposes of convenience, the primary elastomeric thermoplastic polymers of the present invention are sometimes referred to herein as "primary polymers" and the secondary thermoplastic polymers are sometimes referred to herein as "secondary polymers." As the terms are used herein, "primary polymer" and "secondary polymer" are used in a relative sense. That is, these terms are used to identify polymeric materials having large differences in physical properties, and particularly polymeric materials having large differences in melt viscosity characteristics. In particular, the term "secondary polymer" is used to identify those polymers which have a melt viscosity in Kaydol oil at 300° F. which is at least about 50 times greater than the same property of the primary polymer. According to especially preferred embodiments, this viscosity of the secondary polymer is at least about 100 times, more preferably about 200 times, and even more preferably at least about 400 times greater than the melt viscosity of the primary polymer.

Applicants have discovered that the presence of secondary polymer in the present compositions is important to achieving the high temperature slump resistance exhibited by many embodiments of the present invention. More particularly, applicants have found that the high molecular weight of the secondary polymers are capable of holding the gel network of the preferred compositions in a relatively stable, hard and elastic state even at temperatures as high as 80° C. and under conditions involving vibration. On the other hand, the primary polymers of the present invention preferably contribute to at least the following desirable properties of the polymer composite: thermal insulation; electrical insulation; lubricating ability; and flowability at moderately elevated temperatures.

The relative proportions of the polymer and the extender are preferably selected to provide the composition with substantial elastic memory under ambient and moderately elevated temperatures. According to other preferred embodiments, the compositions also possess: a high degree of resistance to penetration and permeation by aqueous media; melt processability; substantially no stratification and/or component separation during temperature cycling; an ability to bond to solid objects inserted into the composition; high cohesive strength; high adhesive strength to juxtaposed connector members; high electrical and thermal resistivity; high strain relief; high material inertness; lubricity vibration dampening and corrosion protection for associated connector members.

Another important aspect of the present invention is the requirement of certain low temperature embodiments that the extender comprise at least about 25%, and even more preferably at least about 35% of an extender having a secondary swelling percentage of greater than about 1000%, and even more preferably at least about 1500%. It is also generally preferred for such embodiments that the extender have a viscosity at −22° C. of no greater than about 500,000 cps, more preferably no greater than about 100,000 cps and even more preferably no greater than about 20,000 cps.

Applicants have also discovered advantageous methods for preparing the present sealant-compositions. The present methods preferably require mixing the organic elastomeric thermoplastic polymer and the extender under easily achieved time and temperature conditions sufficient to produce an at least partially gelled organic polymer/extender composition, as evidenced by a substantial increase in the viscosity of the mixture. The present methods offer substantial advantages over the methods required to prepare prior art compositions. For example, the amount of energy required to produce sealant compositions according to the present methods is small relative to prior art methods. This arises, at least in part, from elimination of the requirement for lengthy high shear mixing and/or extremely elevated temperature processing required by the prior methods.

The present invention also provides moisture and temperature resistant electrical connectors which are readily field reusable and repairable even at relatively low temperatures, for example, −22° C. Such connectors include a connector body having a receiving means for accepting and receiving a transmission means and a sealant composition disposed along or adjacent to the receiving means. The preferred connectors also include means for inhibiting unwanted removal of the sealant composition from the connector body. According to especially preferred embodiments, the removal-inhibiting means also comprises means for wiping sealant from solid objects, such as said transmission means, upon removal of said objects from the connector body. According to another preferred connector embodiment, the sealant composition disposed along or adjacent to the receiving means of the connector body comprises a sealant composition according to the present invention. Due in large part to the beneficial characteristics and properties of the present sealants, such connectors provide a highly moisture and temperature resistant, readily repairable and/or modifiable electrical connection.

Methods for using the present sealants to establish a moisture resistant, readily repairable connection are also provided.

DESCRIPTION OF THE DRAWINGS

FIG. 4 is a side view of the connector body.

FIG. 5 is a top view of the connector body.

FIG. 6 is a back view of the connector body.

FIG. 7 is a stamped blank prior to being rolled into a connector body.

FIG. 12 is a longitudinal sectional perspective view of an uncrimped ferrule type pre-insulated crimpable insulation displacement connector having sealant therein.

FIG. 13 is a cross-sectional view taken along line 13–13 of FIG. 12.

FIG. 14 is a view similar to FIG. 13 but showing the positions of the sealant and the parts after crimping.

DETAILED DESCRIPTION OF PREFERRED EMBODIMENTS

I. THE COMPOSITIONS

Figure 1:
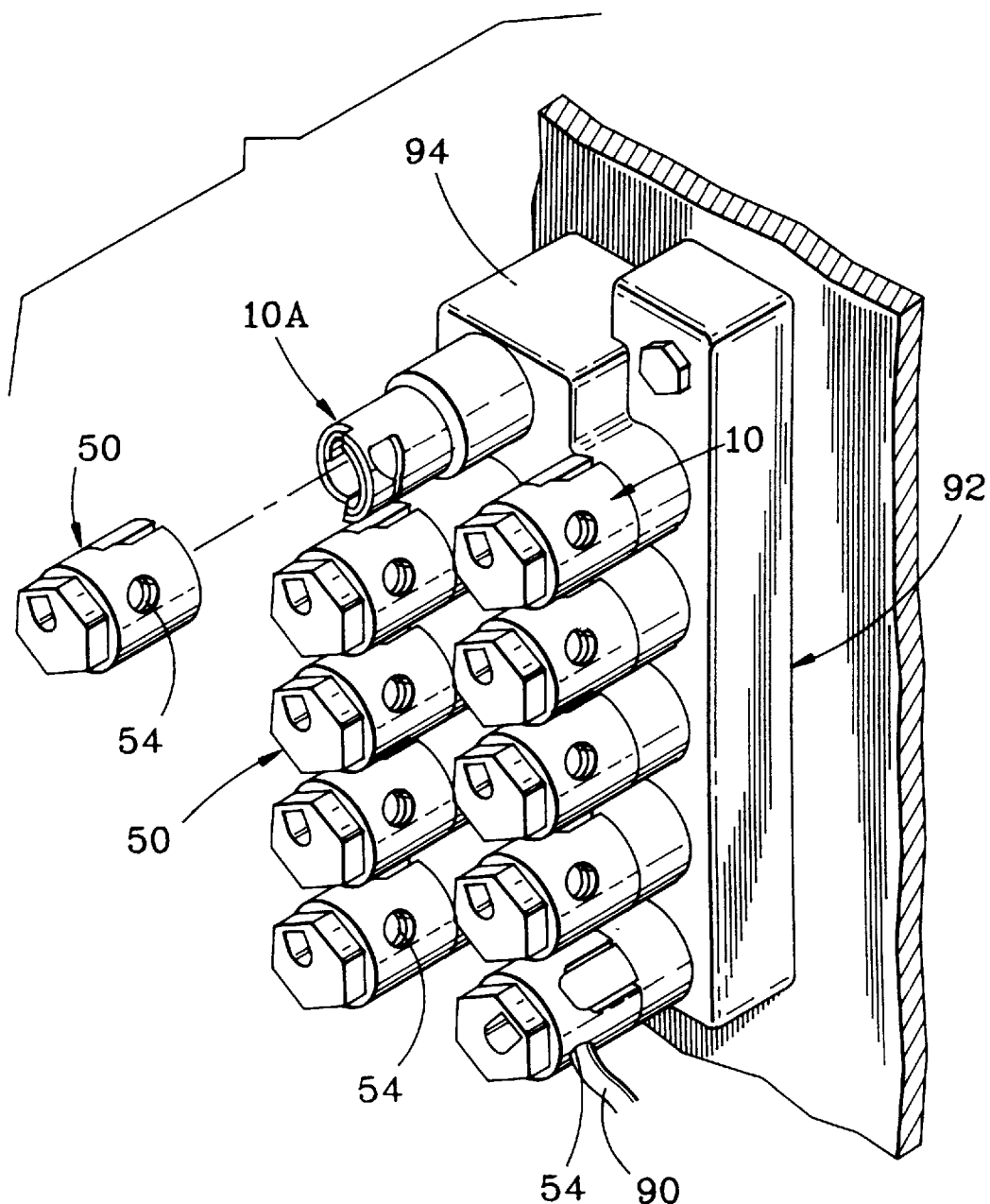
FIG. 1 is a perspective view partially exploded showing an array of silo-type rotary insulation displacement electrical connectors.

The present invention provides sealant compositions requiring two essential components: elastomeric thermoplastic polymer, preferably an organic polymer composite comprising primary and secondary polymers, and extender for the polymer.

An important aspect of the present invention is the requirement of certain embodiments that the elastomeric, thermoplastic polymer comprise a composite comprising primary polymer and secondary polymer, with the primary:secondary polymer weight ratio being at least about 4:1, and even more preferably from about 4:1 to about 20:1. The term polymer composite is used herein to designate polymer compositions comprising two or more polymeric compounds, preferably two or more polymeric compounds mixed together in intertwined domains or in interspersed domains. Thus, the term polymer composite includes within its scope simple microscopically cellular mixtures of two or more polymers, interpenetrating polymer networks, graft copolymers, block copolymers and combinations of these. It is contemplated that one or more of the above-noted polymeric configurations may be included in the structure of the present polymer composites.

Although it is contemplated that the preferred primary and secondary polymers in accordance with the present invention may have a relatively wide range of melt viscosities depending upon the particular application requirements, it is generally preferred that the primary polymer in accordance with the present invention have a melt viscosity of less than about 10,000, more preferably less than about 5,000, and even more preferably less than about 1,000. Unless otherwise indicated herein, melt viscosity refers to the viscosity of polymer at 150° C. measured in accordance with the procedure described in Example 1 hereof.

The secondary polymers of the present invention preferably have a melt viscosity of greater than about 10,000, and even more preferably greater than about 30,000. In addition, it is generally preferred that the secondary polymer possess an ability to gel with Kaydol oil at temperatures of about 75° C. or higher, whereas the primary polymers substantially do not possess this characteristic.

Another important aspect of the present invention is the requirement of certain embodiments that the extender comprise at least about 25%, and even more preferably at least about 35% of an extender having a secondary swelling percentage of at least about 1500%. The term "secondary swelling percentage" is used herein to identify the ability of an extender to swell secondary polymers represented by Kraton 1654X and 1651X. It is contemplated that many instances the swelling percentage value measured in Kraton 1654X will be substantially the same as the value measured in Kraton 1651X. In the event the values measured are substantially different, however, the lower value from among such two values is intended.

The swelling percentage is measured by adding 1 gram of the polymer to a beaker of the designated extender and allowing the polymer to swell for 24 hours at 60° C. The amount of extender absorbed into the polymer is measured and reported as the percentage based on the original weight of the polymer. According to especially preferred embodiments, the extender consists essentially of extender having a secondary swelling percentage of greater than about 1,000%, and even more preferably greater than about 1,500%.

Applicants have found that the enhanced low temperature properties of the present sealant, especially wire insertion, are related to the "secondary swelling percentage," as opposed to a swelling percentage based on a primary polymer component of the present invention. Although applicants do not wish to be necessarily bound by or to any particular theory of operation, it is believed that the importance of the secondary swelling percentage is related to the operation of the secondary polymer in the present sealant composition. As mentioned hereinbefore, the secondary polymer component helps to achieve high temperature slump resistance because the high molecular weight secondary polymers are capable of holding the gel network in a relatively stable, hard and elastic state at temperatures as high as 80° C. Applicants believe that this characteristic, which is beneficial at high temperatures, tends to negatively affect the low temperature properties by making the sealant hard and difficult to enter as temperature is decreased. Accordingly, the utilization of an extender having a high secondary swelling percentage tends to compensate at low temperatures for this negative feature of the secondary polymer.

Importantly and desirably, the physical characteristics of the present compositions vary according to, among other conditions, the temperature of the composition. As will be understood by those skilled in the art, sealant compositions are preferably operative over definite time and temperature service ranges. That is, it is highly preferred that the sealant compositions maintain important specified characteristics substantially over an entire range of expected operating temperatures. Typically, difficulties arise in connection with the ability of the compositions to effectively operate at the extremes of the temperature range, and compositions which overcome these difficulties are highly desirable.

According to preferred embodiments, the sealants possess a low temperature wire insertability of at least about 80, more preferably at least about 100, and even more preferably at least about 120. As used herein, low temperature wire insertability is measured at about −22° C. using a modified form of ASTM D217 (measured in units of 0.1 mm) in which the cone apparatus is replaced by a 0.100 inch diameter jacketed bridle wire and the impressor weight is 48.4 g. Applicants have found that compositions having the preferred low temperature wire insertability of the present invention contribute significantly to the low temperature field repairability of the present connectors.

The present sealants also preferably possess exceptional values for two high temperature properties, namely, slump and spew resistance. Those skilled in the art will appreciate that it is exceptionally difficult to achieve such high temperature characteristics while also achieving the low temperature wire insertability of the present invention. Furthermore, in order to maintain spew and slump resistance at high temperatures, many prior art sealants were stiff or rigid and difficult to process because of their high content of extender retaining components. Applicants have discovered, however, that the sealants of the present invention are capable of being flowable and thus easily processed at moderately elevated temperatures without sacrificing the operating requirements of the sealant.

As reported herein, the spew resistance (oil retention/extender retention) of a sealant is measured according to the protocol expressed in Federal specification #321.1. Generally, measurement of spew resistance comprises loading the defined weight of sealant into a conical container having walls consisting of a stainless steel mesh as specified according to the federal standards. The amount of material which migrates from the conical container after the specified time period at the specified temperature is a measure of the ability of the present sealants to resist spewing or exudation of the extender portions thereof. The spew resistance is reported herein as percent extender retention and is determined by dividing the sealant weight contained in the conical container after the test by the weight of sealant at the start of the test. Although the amount of spew resistance may vary widely within the scope of the present invention, it is generally preferred that the present compositions exhibit a spew resistance of at least about 99% extender retention at about 80° C., and even more preferably at least about 99.5% at about 80° C.

As reported herein, slump resistance is measured by a modified version of ASTM Test method D2202. In general, the unmodified ASTM test D2202 requires formation of a cylindrical cavity in a metal sheet or slab by withdrawing a mating cylindrical body or piston from the slab. This cavity is then filled with the material to be measured. According to the unmodified version of the test method, the slab is placed in a vertical position, and the piston is then driven forward to occupy one-half of the original cavity space, thus causing about one-half of the original test material volume to be displaced past the surface of the slab. Upon heating to the test temperature, the amount of downward droop or movement of the displaced material is measured. According to the modification utilized herein, the piston is driven forward to occupy all of the original cavity volume such that face of the piston is flush with the surface of the slab. As a result, the entire body of sealant is displaced from the cavity. In this way, the modified ASTM test D2202 measures not only the slump resistance of the sealant material, but also its adhesive properties. Although the amount of slump resistance may also vary widely within the scope of the present invention, it is generally preferred that the present compositions exhibit a slump resistance of less than about 0.5 in. of slump, and even more preferably less than about 0.2 in. of slump at about 80° C.

Another important aspect of certain embodiments of the present invention resides in sealant compositions having both high temperature spew and slump resistance while also having low temperature wire insertability. Accordingly, the present sealant compositions preferably have a slump of less than about 0.5 at about 80° C., and even more preferably less than about 0.2 at about 80° C., a spew resistance of at least about 99% at about 80° C. and wire insertability of at least about 100 at about −22° C.

Although the operating temperature range of any particular sealant will depend upon numerous factors regarding the expected application, the present sealant compositions preferably have an operating temperature range of from about −25° C. to about 125° C. At relatively low temperatures, for example, from about −25° C. to about +80° C., the present compositions are preferably especially soft, tacky and rubbery. At relatively elevated temperatures, for example above about 125° C. to about 150° C., the compositions are preferably flowable while substantially resisting spew and slump, thus enabling the material to be more easily handled during the process of incorporating the sealant into the connector. Unless otherwise specifically indicated, the term "flowable" refers to the ability of the compositions to become fluent or viscid upon the application of shear stress or pressure.

As reported herein, the flowability of the present sealants is measured by exposing about 50 grams of the sealant in the cylindrical chamber of a standard hot melt gun to an extrusion pressure of about 30 psi at about 163° C. for about 3 seconds and measuring the weight of sealant extruded from the gun. For purposes of defining flow conditions, the extrusion pressure is used as an expression of shear stress. The flowability measurements presented herein are obtained using a hot-melt extrusion gun available from Fastening Technology, Inc. of Charlotte, N.C. sold under the trade name "PAM-Model 500-E." Such a gun is provided with a 0.048 inch inside diameter type B nozzle. Such a nozzle is available from AMP Incorporated as part number 91H195.

Although the amount of flow may vary widely within the scope of the present invention, it is generally preferred that the present compositions exhibit at least about 0.1 g per 3 sec. (2 g/min.), and even more preferably at least about 0.5 g per 3 sec. (10 g/min.) of flow at about 160° C.

For temperatures of from about −22° C. to about 80° C., the present compositions preferably exhibit an elastic memory of at least about 100%, more preferably at least about 300%, and even more preferably about 500%. As the term is used herein, elastic memory refers to the ability of a composition to return to about its original configuration after being subjected to the designated extent of elongation. The high degree of elastic memory exhibited by the present compositions provides sealants with a highly advantageous "self-repairing" property. That is, the present sealants will deform to accommodate stress exerted by, for example, the insertion of an electrical wire into a mass of the sealant. Upon removal of the wire and hence the accompanying stress, the exceptional elastic memory of the present compositions causes the mass of sealant to return to substantially its original shape and thereby to substantially fill the void resulting from the removal of the wire. This self repairing quality of the present sealants is one important aspect of the present invention. Another important aspect is the ability to self-heal while self-repairing. In addition, the sealants of the present invention contribute to their bond with and move with the wires when flexed functionally, thereby contributing to the integrity of the seal and to vibration tolerance.

For temperatures of from about −22° C. to about +80° C., the present compositions preferably have an adhesive strength of at least about 2 g. According to certain embodiments, the adhesive strength is preferably at least about 5 g at temperatures of from about −22° C. to about +80° C. Applicants have found that the adhesive strength of the present sealant compositions is related to the ability of the compositions to provide a sealed electrical connection, and that the use of high adhesive strength compositions will generally produce high quality electrically insulated connections. As the term is used herein, adhesive strength refers to the amount of force, as measured by gram weight under standard gravity conditions, required to remove an 18½ gauge PVC covered electrical wire from a mass of sealant contained in a standard terminal block silo. The measurement of adhesive strength is preferably made by inserting about ¼ inch of the PVC covered wire into the sealant-filled terminal block silo and measuring the amount of force required to remove same. As used herein, the term standard terminal block silo refers to a substantially cylindrical connector housing having a height of about 11 mm, an inner diameter of about 14 mm, and a free volume of about 1.6 ml, with a substantially circular access opening of about 5 mm diameter in a sidewall thereof.

The excellent ability of the present compositions to effectively seal electrical connections is also due, at least in part, to the combination of high elastic memory and high adhesive strength exhibited by the compositions disclosed herein. In particular, the high wetting and conformability and elastic memory of the present compositions result in a material which strongly captivates objects, such as electrical wires, inserted into a mass thereof. This feature, along with the high insulation resistance and the strong tendency of the present compositions to adhere to such objects, produce an effective and long-lived isolation of the electrical connections from the surrounding environment.

The present compositions also preferably have a high cohesive strength, where high cohesive strength is characterized by a relative absence of residue on a wire when detached from connectors. For the purposes of convenience and illustration, cohesive strength is measured herein by determining the gram weight of sealant which is removed from a standard connector silo when an 18½ gauge PVC covered steel electrical wire is removed from a mass of sealant contained in a standard terminal block silo. The measurement of cohesive strength is preferably made by inserting about ¼ inch of the PVC covered wire into a standard sealant-filled terminal block silo and measuring the amount of sealant which is removed from the silo when the wire is removed. The cohesive strength is therefore used herein to refer to the tendency of sealant to remain as a unit mass in the connector silo when the 18½ gauge PVC covered electrical wire is withdrawn, as will typically occur during repair and/or replacement of electrical connectors. For temperatures of from about −22° C. to about +80° C., the present compositions preferably have a cohesive strength as measured by sealant removal of no greater than about 0.2 g, more preferably no greater than about 0.04 g, and even more preferably no greater than about 0.01 g.

Another important aspect of certain embodiments of the present invention resides in sealant compositions having both high adhesive strength and high cohesive strength in terms of sealing ability and resistance to damage by repeated connection and disconnection. In particular, it will be generally understood by those skilled in the art that a sealant composition possessing one but not the other of these characteristics will not fully satisfy the objects of the present invention. For example, the use in an electrical connector of a sealant which is high in adhesive strength but low in cohesive strength will result in a large amount of sealant being withdrawn from the connection site during repair or replacement of the connection. On the other hand, the use in an electrical connector of a sealant which possesses high cohesive strength but low adhesion properties will likely produce a poor quality electrical connection seal. Accordingly, the present sealant compositions preferably have an adhesive strength of at least 2 g, more preferably of at least about 5 g and a cohesive strength as measured by removal weight of from about 0 g to about 0.2 g at temperatures of about −22° C. to about +80° C.

Although applicants do not wish to be necessarily bound by or limited to any particular theory, it is believed that the ability of the preferred compositions to exhibit the above-noted combination of beneficial properties is due, at least in part, to the physical and chemical relationship between the components of the present composition. In particular, the combination of an elastomeric thermoplastic polymer and an extender according to the present invention is believed to contribute to the beneficial properties of the compositions. For example, it is contemplated that the polymer composite according to preferred embodiments comprises an interpenetrating polymer network (IPN). It is believed that the presence of such a polymer network, especially in the presence of optional inorganic gelants, maintains the extender portion of the present compositions in a highly stable dispersed, colloidal, gelled and/or networked (reticulated or fused) state in which exudation or spewing of the extender is strongly inhibited. In addition, it is believed that such a configuration contributes to the high cohesive strength of the present compositions.

It is also believed that many of the beneficial properties of certain of the preferred sealants are due, at least in part, to the highly branched structure or partial aromatic content of the preferred extenders used in such embodiments. More particularly, preferred extenders, such as Isopar G, M and V are polymers having a highly branched structure, and it is believed that this branching serves to form a deep entanglement with the polymer network, thereby resisting separation from the network. Furthermore, partial aromatic content, as with Shelflex 371, is believed to modify the glassy domains, such as polystyrene domains, of the preferred network to reduce the low temperature stiffness of the network. These structural relationships, in turn, result in very high toughness and cohesive strength in terms of low wire residue at both high and low temperatures.

As those skilled in the art are aware, interpenetrating polymer networks (IPNs) are a special class of polymer blends in which two or more polymers exist in a highly networked structure. As the term is used herein, interpenetrating polymer network refers to true IPNs, apparent IPNs, semi-IPNs, and combinations and hybrids of these. As the term is used herein, a true IPN refers to those polymer network domains in which two or more polymer systems are crosslinked within their own domains but not to each other. In true IPNs, the distinct polymer systems form crosslinked network domains that interpenetrate each other. As the term is used herein, a semi-IPN refers to those polymer networks in which one polymer system exists in an uncrosslinked state while a second polymer system is crosslinked within its own domain.

The term physical IPN as used herein refers to co-continuous interpenetrating phases in which none of the polymers is chemically crosslinked but which is nevertheless stabilized by physical polymer crosslinks which may be provided, for example, by the styrene end blocks of styrene-ethylene-butylene-styrene block copolymers. As explained more fully hereinafter, it is believed that the preferred polymer composites of the present invention are believed to comprise a polymer network structure having characteristics of a physical IPN. Additionally, the preferred polymer composite properties may be enhanced by inorganic network formers such as fumed silica.

It is contemplated that the preferred IPNs of the present invention may be formed using a variety of techniques and all such techniques are within the scope of the present invention.

While the mechanisms which create the observed properties and characteristics of the present compositions are not to be construed as fully explained by present technology, it is believed that the preferred embodiments of the present invention comprise compositions in the form of a thermally reversible polymeric gel state. In particular, the present compositions exhibit characteristics which are sometimes associated with thermally reversible polymeric gels. For example, reversible polymeric gels are elastomeric and non-flowable under certain conditions but are converted to a flowable quasi-liquid state when the condition of the gel is altered, for example, by increasing temperature. Thus, it is believed that the present compositions, especially when the components are in the preferred ranges described herein, are in the form of a thermally reversible polymeric gel in which the extender is contained as a colloidal dispersion or solution of liquid in a polymer composite comprising effectively, i.e. functionally, crosslinked thermoplastic elastomer and other polymers.

A. Elastomeric Thermoplastic Polymer

As the term is used herein, organic thermoplastic elastomers are those organic polymers which possess, or which may be plasticized to possess, elastomeric properties under a first set of temperature conditions and which are flowable under a second set of temperature conditions. It is generally preferred that the present elastoplastic polymers, when extended, are elastomeric at temperatures of from about −40° C. to at least about +150° C., and that the polymers become flowable yet thermally stable at temperatures of from about +150° C. to at least about +200° C. in their neat uncompounded state. It is generally preferred that at ambient temperatures the thermoplastic elastomer used in the present polymer composites is sufficiently rigid to retain its general shape and dimension and sufficiently flexible to exhibit substantial recovery upon stretching. As used herein, the term organic polymer refers to polymeric materials in which at least a portion of the polymer backbone is comprised of carbon atoms.

According to specially preferred embodiments, the elastomeric thermoplastic polymer comprises a composite of a primary polymer and a secondary polymer. While it is contemplated that all such composites are adaptable for use according to the present invention, composites comprising a physical mixture of block copolymers have been found to be especially useful and are preferred. It is even more preferred that the present compositions comprise an elastomeric thermoplastic polymer composite in the form of a physical IPN comprising block copolymers, and even more preferably comprising di-block and tri-block copolymers.

It is also contemplated that the relative proportions of primary and secondary polymers may vary over a wide range within the scope of the invention. Such variation will depend, for example, on the particular type of connector in which the sealant composition will be used and the contemplated operating environment for the connector. In general, however, applicants have found that the elastomeric thermoplastic polymer of the present invention preferably comprises a physical IPN, and even more preferably, an IPN comprising a major proportion by weight of primary polymer and a minor proportion by weight of secondary polymer. It is especially preferred that the weight ratio of primary polymer to secondary polymer be no greater than about 20:1, and more preferably no greater than about 10:1. On the other hand, the polymer composites of the present invention preferably have a primary polymer:secondary polymer weight ratio of no less than about 4:1. Furthermore, applicants have also found that it is generally highly desirable for the present polymer composites to comprise at least 0.4% by weight of secondary polymer, and even more preferably from about 0.75% to about 3% of secondary polymer.

Without intending to be bound to or by any particular theory, it is believed that compositions containing less than the above-noted polymer ratio will not possess certain of the desirable and beneficial properties exhibited by the present compositions. For example, the ability of the sealant compositions to remain within the connector during normal operating conditions has been found to deteriorate in certain embodiments when the above-noted lower limit of secondary polymer is not satisfied.

Numerous block copolymers exhibiting elastoplastic properties are known, readily available and within the broad scope of the present invention. The block copolymers used in the present polymer composites preferably contain at least one elastomeric block and one non-elastomeric block. Such block copolymers are referred to generally as A-B di-block copolymers wherein A represents a block of non-elastomeric polymer and B represents a block of elastomeric polymer connected thereto. As the terms are used herein, a block of elastomeric polymer refers to a polymer which can be stretched at about room temperature to at least twice its original length and, after having been stretched and the stress removed, returns with force to approximately its original length in a short time period. In contrast, non-elastomeric blocks according to the present invention do not exhibit this characteristic.

The elastomeric B blocks of the present block copolymers are preferably selected from the group consisting of non-aromatic polyolefins, polyesters, polyethers and combinations of these, with non-aromatic polyolefins being preferred. Polyolefins formed from conjugated dienes, such as butadiene and isoprene, and the partially or fully hydrogenated forms thereof and polyolefins formed from propylene, ethylene, butene and combinations thereof, are especially preferred. It is contemplated that block copolymers having a large variety of chemical constitutions are adaptable for use according to the present invention, since the elastoplastic characteristics are believed not to depend on any specific chemical constitution, but rather upon the polymeric architecture of each of the polymer blocks. Thus, block copolymers having linear, radial or branch structures are generally within the scope of the present invention.

The non-elastomeric A blocks are preferably selected from the group consisting of poly (alkenyl arenes), polyurethanes and combinations of these, with poly (alkenyl arenes) being preferred. The non-elastomeric A blocks may comprise homopolymers or copolymers but preferably are homopolymers prepared from alkenyl arenes, such as styrene, methylstyrene, vinylxylene, ethylenevinylxylene, isopropyl styrene, vinylnaphthalene and the like, with monoalkenyl monocyclic arenes, such as styrenes, being preferred.

Especially preferred block copolymers are di-block and tri-block copolymers. The di-block copolymers have the general configuration A-B with about one A block for each B block, and the tri-block copolymers have the general configuration A-B-A wherein the polymer predominantly contains A blocks at the end of each B block. It is especially preferred that each A block is "hard" crystalline, semi-crystalline or glassy polymer end block segment, such as polystyrene and that B is a "soft" elastomeric polymer mid-block segment, preferably comprised of a non-aromatic polyolefin, such as polyethylene, polypropylene, polybutylene and/or combinations of these. The non-aromatic polyolefin segments of such di-block and tri-block copolymers are generally poorly compatible with the "hard" end-block and form a microscopic two-phase morphology consisting of domains of glassy end blocks interconnected by flexible mid-block chains. The physical elastomeric network structure of such di-block and tri-block copolymers is reversible, and heating the polymer above the end-block glass transition temperature will temporarily disrupt the structure, which can be restored by lowering the temperature.

Three primary polymers in accordance with preferred aspects of the present invention are Kraton 1701X, Kraton 1652 and Kraton 1650. KRATON 1701X is a low strength di-block copolymer, poly(styrene-ethylene-propylene), sold by Shell Development Corporation. As described in the Shell Company Technical Bulletin SC1102-89, KRATON 1701 has a melt viscosity of 209 when present at a concentration of 5% in Kaydol oil at 300° F. KRATON 1652 is a triblock copolymer, poly(styrene-ethylene-butylene-styrene), sold by Shell Development Corporation. KRATON 1652 has been tested and found to have a melt viscosity of about 26 cps. KRATON 1650 is a triblock copolymer, poly(styrene-ethylene-butylene-styrene), sold by Shell Development Corporation. KRATON 1650 has been tested and found to have a melt viscosity of about 35 cps.

Two preferred secondary copolymers in accordance with the present invention are KRATON 1651 and KRATON 1654. KRATON 1651 is a poly(styrene-ethylene-butylene-styrene) tri-block copolymer, available from the Shell Development Corporation, having a styrene end block to ethylene and butylene center block ratio of about 33:67. As described in the Shell Company Technical Bulletin SC1102-89, KRATON 1651 has a melt viscosity of 42,700 when present at a concentration of 5% in Kaydol oil at 300° F. KRATON 1654 is a triblock copolymer, poly(styrene-ethylene-butylene-styrene), sold by Shell Development Corporation as a low molecular weight analog of KRATON 1651X. KRATON 1654 has been tested and found to have a melt viscosity of about 14,200 cps.

Tri-block copolymers as described herein can be prepared according to a number of well-known techniques, including the methods described in U.S. Pat. No. 3,485,787—Haefele, which is incorporated herein by reference.

It is contemplated that the elastomeric thermoplastic polymer of the present invention may also comprise thermoplastic polyolefin elastomers, thermoplastic polyurethane elastomers and thermoplastic polyester/polyether elastomers. In general, such polyurethanes are addition polymers obtained from the chemical reactions of isocyanates. Isocyanates commonly used in the formation of polyurethanes are toluene diisocyanate, diphenyl methane diisocyanate isophorone diisocyan and polymeric diisocyanates (PMDI), polymers derived from the condensation of aniline with formaldehyde. Polyurethane and polyester/polyether thermoplastic elastomers are alternating block copolymers having segments of the "hard," highly polar or crystallizing material, such as polyurethane, linked by "soft" segments of amorphous materials, such as polyester which are rubber-like at normal temperatures. Thermoplastic polyolefin elastomers may be ethylene-propylene or other ethylene-alpha-olefins.

The present compositions preferably comprise a minor proportion by weight of organic thermoplastic elastomer. It is especially preferred that the sealants of the present invention comprise less than about twenty percent, and even more preferably no more than about 10–12 percent, by weight of organic thermoplastic elastomer.

B. The Extender

Applicants have found that the extenders of the present invention impart highly beneficial and advantageous characteristics to the sealant compositions and to the methods by which such compositions are prepared. In particular, extenders comprising at least about 25% by weight of an extender having a secondary swelling percentage of greater than about 700%, and more preferably no less than about 900%, and even more preferably no less than about 1200% contribute to the surprising and unexpected low temperature wire insertability of the present compositions and connectors.

In addition, it is highly preferred that the extender comprise polymeric components having a highly branched structure, and it is even further preferred that the extender component having the high secondary swelling percentage have such a highly branched structure. Applicants have found that this combination aids in spew resistance as well as low temperature wire insertability. Applicants believe that this advantage is provided, at least in part, by the IPN type structure of the preferred polymer composites of the present invention together with the integration of the preferred extenders with such IPN structures.

In general, the extender of the present invention generally performs one or more of several functions, and accordingly a large number of available extenders may be utilized, provided the requirements described herein are satisfied. For example, particular extenders may be chosen to increase or decrease the workability, flexibility and/or distensibility of the thermoplastic elastomers of the present invention, depending upon the particular application. As is well known to those skilled in the art, extenders are generally high boiling, chemically and thermally stable organic liquids, low-melting solids or semi-solids.

The extender is preferably present in a large weight percentage of the composition in order to reduce the overall cost of the compositions without negatively affecting the beneficial properties thereof. With the guidance provided herein, it is expected that one skilled in the art will be capable of selecting the extender needed for any particular application without undue experimentation.

An important aspect of the present invention resides in the ability of the extender to fluidize, solvate, gel and/or fuse with the thermoplastic elastomer and/or the inorganic cross-linked polymer. In this regard, it is believed that the extenders of the present invention achieve the desired result through external plasticization of the present compositions. That is, it is believed that the present extenders interact primarily physically and not chemically with the components of the above described polymer composite to reduce the mutual attractive forces between polymer chains in the sealant compositions. Accordingly, while the compositions of the present invention may include a certain amount of internal plasticization, such as, for example, copolymerization of the extender with the polymer blend, this is not believed to be necessary or desirable for operation of the present invention. Thus, the extenders of the present invention preferably serve to aid in the processing characteristics of the present compositions to impart flexibility, elongation and toughness to the compositions without reacting chemically therewith. It is generally preferred that the present extenders are relatively viscous materials having a pour point of about 0° C. or less, and even more preferably from about −40° C. to about −10° C.

It is contemplated that numerous known and available materials may be used as extenders according to the present invention. The particular extenders selected will depend upon factors such as expected conditions of use, expense and other components in the composition. It is contemplated that those skilled in the art will be able to select appropriate extenders for any particular application in view of the information provided herein.

For preferred compositions having the low temperature wire insertability properties described above, it is preferred that the extender be selected from the group consisting of napthenic oils; paraffinic oils and solvents; white oils; poly-alpha-olefins such as poly-alpha-octene, decene, and undecene; terpenoid hydrocarbons; polyolefins; aliphatic hydrocarbons, such as aliphatic mineral oil; aromatic hydrocarbons, such as aromatic-containing mineral oil; C1–C6 non-aromatic polyolefins, such as polybutene; ester compounds, such as monomeric phthalate esters, dibasic acid esters, trimellitates, phosphate esters and polyesters; glycol benzoates; citrates; adipates; isophthalates; chlorinated hydrocarbons; sebacates and mixtures and combinations of these. A preferred class of extender from within this group are the refined paraffinic/naphthenic oils sold by the Shell Oil Company under the trade designation Shellflex. The Shellflex oils are generally preferred because they are highly branched paraffinic/naphthenic synthetic hydrocarbons having a relatively constant composition and molecular weight and a favorable naphthenic content for extender performance. In addition, applicants believe that the small concentration of aromatic carbon atoms in the Shellflex oils, for example, 1–10%, enhances the performance of those materials. Particularly preferred among the Shellflex oils is Shellflex 371, which according to the Shell Chemical Co. Technical Bulletin comprises approximately 53% paraffinic carbon atoms, 46% naphthenic carbon atoms and 1% aromatic carbon atoms. Furthermore, the molecular weight of Shellflex 371 is about 400. Other preferred extenders of this type include Kaydol Oil, which comprises about 55% paraffinic carbon atoms, 45% naphthenic carbon atoms and trace aromatic carbon atoms, and Tufflo 6056, which comprises about 68% paraffinic carbon atoms and 32% naphthenic carbon atoms. Thus, a preferred extender according to the present invention comprises a synthetic oil having a molecular weight of from about 250 to about 450 and comprising from about 40% to about 60% of paraffinic carbon atoms, from about 30% to about 60% naphthenic carbon atoms, and about 1% to about 10% aromatic carbon atoms.

Although it is contemplated that numerous polyolefins are adaptable for use as extenders in accordance with the present invention, applicants have found that hydrogenated polyolefins, and even more preferably hydrogenated polybutenes, are preferred for use in sealants requiring low temperature wire insertability. Exemplary extenders of this type include products sold by Amoco Chemical under the trade designation Panalane L14E and Panalane H300E.

Applicants have found that the highly branched isoparaffin products sold under the designations Isopar G, Isopar M, Isopar V and Shellflex 371 have secondary swelling percentages within the preferred requirements of the present invention. However, the use of Isopar M and Isopar V is preferred from among the Isopar products because of relatively low volatility thereof. On the other hand, the use of Isopar G is not preferred because of its relatively high volatility. Applicants have found that in extenders of the present invention preferably have a volatility such that the evaporation loss of at about 150° C. is less than about 5% by weight. Applicants have found that the use of extenders which produce compositions with evaporation rates exceeding this preferred value results in a sealant composition that is likely to shrink, harden or otherwise degrade over time and therefore produce unsatisfactory results. According to certain embodiments of the present invention, therefore, the extenders of the present invention are preferably comprised components having molecular weights of from about 300 to 5000, with such components having an evaporation loss at 60° C. for 24 hours of less than about 5% by weight.

The extenders of the present invention may comprise numerous and varied combinations of particular extenders provided that the requirements described above are satisfied by the combination.

Applicants have found that compositions with highly preferred properties are obtained when the extender comprises a hydrogenated C1–C4 polyolefin or an ethylene-propylene polymer oil, with hydrogenated polybutenes being preferred. Applicants have found that extenders comprising such polyolefins, especially extenders comprising at least about 90 percent by weight of low molecular weight highly paraffinic polyisobutylenes, are capable in certain embodiments of enhancing the adhesive properties of the sealant, thus contributing to the ability of the composition to seal electrical contacts from corrosive environments. Such materials are available from Amoco Chemical under the trademark INDOPOL H-100 and from Exxon under the trademark VISTANEX LM-MS. With respect to polyisobutylene extender, the term low molecular weight is used herein to refer to such materials having a viscosity average molecular weight (Staudinger) of about 3000 to about 11,700. Molecular weights of from about 7000 to about 10,000 are especially preferred for applications requiring strong adhesion strength. It is also preferred that the C1–C4 polyolefins have a pour point of about 32° F. or less, and even more preferably from about 5° F. to about 32° F. Such polybutylene extenders are available from Amoco under the designation INDOPOL H-100.

Ethylene-propylene polymer oils, also known as liquid EPDM rubbers are available from Uniroyal Chemical Co., Middlebury, Conn. under the trademark TRILENE CP4038 (3300 molecular wt.) and TRILENE CP80 (7200 molecular wt.).

According to certain preferred embodiments of the present invention, the extender comprises mineral oil. Without being bound by or limited to any particular theory, it is believed that the presence of mineral oil contributes to the wetting ability of the composition. The mineral oils of the present invention are preferably relatively high viscosity mineral oils having an SUS at 100° F. of from about 300 to about 600, a specific gravity at about 25° C. of about 0.85 to about 0.89, and a pour point of from about −25° C. to about 0° C. A preferred material is available from the Sonneborn Company, a division of Witco Corp., under the designation KAYDOL. Mineral oil sold under the trade name BRITOL 55T from Malcolm Nicol & Co., Inc., Lindhurst, N.J., and TUFFLO 60564 from ARCO Chemical Co. are also preferred mineral oils for use in the extender of the present invention. An especially preferred mineral oil is Shellflex 371.

Applicants have found that compositions with highly preferred properties are obtained when the extender comprises a mixture of extenders, and particularly a mixture of extenders comprising aliphatic hydrocarbon and hydrogenated C4 polyolefin, with paraffinic-naphthenic oils and solvents being the preferred hydrocarbon and hydrogenated polyisobutene being the preferred C4 polyolefin. Applicants have found that extenders comprising such mixtures, especially extenders comprising at least about 50 percent by weight of such mixtures, are capable of at once providing thermoplastic elastomers with an excellent ability to wet out objects brought into contact with the composition, excellent adhesive strength and excellent cohesive strength and excellent low temperature wire insertability. According to a preferred embodiment of the present invention, the extender comprises about 70 parts by weight of extender(s) having a secondary swelling percentage of at least about 900% and about 20 parts by weight of extender(s) having a secondary swelling percentage of at no greater than about 700%.

It is contemplated that the amount of extender used can vary widely, depending upon such factors as the expected use of the composition, the characteristics of the elastomeric thermoplastic, and the like. An important advantage of the present compositions, however, is the ability to incorporate very large concentrations of extender in the composition without negatively affecting the beneficial properties thereof. Thus, it is highly preferred that the extender:polymer composite weight ratio of the composition is from about 99.5:0.5 to about 85:15, and even more preferably from about 93:7 to about 88:12. For the purposes of determining this ratio, the composite weight is the weight of the primary and secondary organic thermoplastic elastomeric polymers together.

C. Other Components

It is contemplated that the present sealant compositions may include other components which provide other desirable properties to the sealant composition without detracting from the beneficial characteristics mentioned above.

It is contemplated that corrosion inhibitors, preferably minor amounts thereof, may be included in the present sealant compositions to enhance the integrity of the connection. Such inhibitors are available in wide variety of types and grades and from a wide variety of sources, and all such inhibitors are within the scope of the present invention. High molecular weight synthetic barium sulfonate is a corrosion-inhibiting material available under the trade name NA-SUL BSN from the R. T. Vanderbilt Company in Norwalk, Conn. Chemisorption components are available from PMC Incorporated under the trade designation COBRATEC 99 and may be incorporated in minor amounts in the present compositions.

Antioxidants may also be incorporated, preferably in minor amounts, in the present sealing compositions. Preferred antioxidants are hydroxyhydrocinnamate based compounds available from Ciba-Geigy Corporation, Hawthorne, N.Y., under the trade designation "IRGANOX." A mixture of IRGANOX 1010 and IRGANOX 1035 is preferred. Other antioxidants are available from the American Cyanamid Company, Wayne, N.J., under the trade designation "CYANOX." Particularly preferred CYANOX compounds are CYANOX 1790 and CYANOX LTDP.

The present compositions may also contain light and heat stabilizing components, preferably in minor amounts. One such stabilizer is available from the American Cyanamid Company under the trade designation "CYASORB." Especially preferred CYASORB materials are CYASORB UV3346. Another preferred stabilizer is TINUVIN 237 available from Ciba-Geigy Corporation. The present compositions may also contain minor amounts of fungicides and/or antimicrobials. Such materials are available from Morton International Specialty Chemicals Group, Danvers, Mass., under the trade designation "VINYZENE" and from Calgon Corporation under the trade designation "METASOL TX-100." In certain preferred embodiments of the present invention, the sealant compositions may also include a thickening agent such as silica and preferably fumed silica. Silica may also serve to act as a temperature stabilizing agent. Such materials are available as fully hydrophobized surface treated amorphous silicas from Cabot Corporation under the designations "CAB-O-SIL," such as "CAB-O-SIL TS-610" and "CAB-O-SIL TS-530" and from Degussa Corporation under the designation "AEROSIL R-974." Hydrophilic amorphous silicas are available from Cabot Corporation under the trade designation "CAB-O-SIL M-5" and from Degussa Corporation under the trade designation "AEROSIL 200." Incorporation of minor amounts, preferably less than about 8% by weight, of silica into the present compositions tends to favorably control the rheology of the sealant and to enhance the cohesive strength thereof.

The present compositions may optionally include a polymer composite which comprises a cross-linked polymer, preferably an inorganic cross-linked polymer, and even more preferably a cross-linked silicon-based polymer. As the term is used herein, inorganic polymer refers to polymers having inorganic elements making up at least a portion of the backbone of the polymer chain. With respect to the preferred silicon-based polymers of the present invention, silicon atoms contribute to the chemically inert and environmentally benign character of the polymer and are present either alone in the backbone or with atoms of oxygen, carbon, nitrogen, etc. in the backbone. Thus, the term silicon-based polymer is used herein to refer to a wide range of silicon containing polymers, including polysilanes, polysiloxanes, polysilalkylenes and polysilarylenes, with polysiloxanes being preferred. Siloxane polymers are commonly referred to as silicone polymers and will frequently be referred to herein as such.

The siloxane type polymers of the present invention preferably have the general structure shown below and may be prepared, for example, by ring opening polymerization of a trimer or a tetramer:

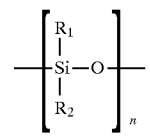

where $R_1$, and $R_2$ are the same or different and are H, OH, alkyl, alkenyl, aryl or aryl-alkyl and n is the degree of polymerization.

The preferred silicon-based polymer of the present invention is at least partially cross-linked. A large variety of cross-linked silicon-based polymers and precursors therefor are available and all such polymers are within the scope of the present invention. For example, cross-linked silicon-based polymers may be formed by reacting functionally terminated siloxane polymer chains with a polyfunctional end linker. It is preferred that the cross-linked polymers of the present invention comprise, preferably in major proportion, cross-linked silicone polymers formed by platinum catalyzed vinyl-addition reactions between hydride- and vinyl-functionalized silicone polymers.

For compositions which contain the optional cross-linked inorganic silicon based polymer, it is especially preferred that silicon-based polymer is cross-linked in the presence of the thermoplastic elastomer of the present invention. As the term is used herein, a polymer cross-linked in the presence of another polymer refers to chemical cross-linking reactions in which the reactants are intimately intermixed with the other polymer or precursors for the other polymer as the reaction takes place. It is preferred that such intimate mixing during the cross-linking reaction results in the formation of an interpenetrating polymer network.

According to certain embodiments, the present compositions preferably comprise a minor proportion by weight of inorganic cross-linked polymer. It is especially preferred that the sealants of the present invention comprise less than about 35 percent, and even more preferably less than about 25 percent, by weight of inorganic cross-linked polymer. The organic thermoplastic elastomeric polymer and the inorganic cross-linked polymer may together comprise less than about 20 percent, and even more preferably less than about 15 percent, by weight of the composition. Such embodiments are not only advantageous from an economic point of view, they possess surprisingly beneficial results.

The details of the preferred methods for forming the polymer composites of the present invention are described more fully hereinafter.

II. THE CONNECTORS

It is contemplated that the desirable properties of the present compositions will be advantageous in a wide variety of applications, including electrical connections and splices, and all such applications which utilize the present compositions are within the scope of the present invention. Moreover, the present invention also provides connectors, splices and cables which eliminate or substantially reduce the tendency of sealant compositions used therewith to migrate or ooze from the connector, splice or cable. Connectors according to preferred embodiments are adaptable for use with a wide variety of sealant compositions, including those of the type disclosed in the prior art as well as those of the present invention.

The present invention provides moisture proof, temperature resistant and noise resistant electrical connectors for sealingly connecting transmission means therein. The preferred connectors of the present invention comprise a connector body having a terminal means for accepting and electrically connecting to the transmission means inserted appropriately into the connector body and a sealant composition disposed along or adjacent to the terminal means of the connector body. In order to maximize the sealing ability of the connector, the connector body preferably comprises a substantially closed housing or container, and the container is preferably substantially filled with sealant composition.

In addition to the two specific connector types illustrated in the drawings hereof, it is contemplated that sealants in accordance with the present invention may also be advantageously used to seal modular connectors of the type adapted to terminate numerous conductor plates, such as the modular connector sold by 3M under the trade designation MS $^{2TM}$ Super Mate 4005-CBM Encapsulated Bridge Module. Such connectors are designed as pre-sealed, sealant filled connector and bridge modules and are intended to be crimped. A preferred sealant composition for use with such connectors comprises about 90 pbw of extender and about 10 pbw of thermoplastic elastomeric polymer. In such embodiments the extender preferably consists essentially of synthetic oil having a molecular weight of from about 250 to about 450 and comprising from about 40% to about 60% of paraffinic carbon atoms, from about 35% to about 60% naphthenic carbon atoms, and about 1% to about 10% aromatic carbon atoms, such as Shellflex 371. Furthermore, the thermoplastic elastomeric polymer component preferably comprises primary and secondary polymer having a primary:secondary weight ratio of from about 4:1 to about 10:1.

In certain embodiments, the container includes access means for allowing entry of the transmission means into the connector body for contact with the terminal means and the sealant composition. The access means preferably comprises, in its final form, said container having an access opening therein. It will be appreciated by those skilled in the art that, under certain conditions, many of the prior sealant compositions contained in such a container tended to migrate or ooze from the connector body through the access means. While the sealant compositions of the present invention possess properties and characteristics which substantially reduce or eliminate such migration, it is preferred that the present connectors include wiper means substantially covering said access opening for allowing withdrawal of the transmission means from the connecter while retaining said sealant within said housing. The provision of wiper means according to the present invention advantageously facilitates repair and replacement of electrical connections. In particular, the wiper means provides ingress and egress to the transmission means while simultaneously substantially reducing the migration of sealant composition, even relatively flowable and migratory sealants, from the connector.

It is preferred that the wiper means of the present invention comprise a resilient thin membrane adhered to the connector body and covering the access opening. Such resilient membrane also preferably includes an access opening therein for permitting entry of the transmission means into the connector body wherein the dimension between at least two edges of said resilient membrane access opening are less than, and preferably substantially less than, the cross-section of said transmission means. In this way, the edges of such opening provide means for wiping sealant composition from the outer surface of the transmission means when the transmission means is withdrawn from the connector body, as frequently is required during repair operations. According to certain embodiments it is preferred that the smallest dimension of the wiper means access opening is at least about 0.2 times the smallest cross-sectional dimension of the transmission means, and even more preferably about 0.1 times the smallest dimension of the connector body access opening.

The resilient membrane used according to the preferred embodiments of the present invention should provide sufficient flexibility to allow the transmission means to be readily inserted and withdrawn from the connector body while simultaneously possessing sufficient rigidity to overcome any adhesion forces between the sealant composition and the transmission means, thereby wiping sealant means from the transmission means during the withdrawal process. While it is contemplated that a large number of materials in varying thicknesses and sizes are adaptable for use according to the present invention, thin polyurethane films having a thickness of from about 1 mm to about 5 mm are preferred.

It is also contemplated that the particular shape and configuration of the access opening in the wiper means will vary depending upon the type of sealant used and particular applications involved. For example, the access opening may comprise a simple slit in the resilient film, a star pattern of slots or an aperture of circular, square or triangular shape.

These and other access openings are all within the scope of the present invention.

A. First Embodiment

A first preferred embodiment of the present invention will now be described in connection with FIGS. 1–11. Connectors of the general type illustrated in these figures are described in U.S. Pat. Nos. 4,705,340 and 5,006,077, each of which is incorporated herein by reference and assigned to the assignee of the present invention. These connectors are available from AMP Incorporated under the trade designation "QuietFront."

Referring now to FIG. 1, a terminal block 100 having a plurality of silo-type rotary insulation displacement electrical connectors 10 is illustrated. The connector housings 10 house a terminal, referred to generally as 10A in FIGS. 2 and 3, substantially closed at the top by mating rotatable cap 50 and at the bottom by, for example, the base 110 of terminal block 100. The terminal 10A is substantially cylindrically-shaped and has a upper insulation displacement portion 8 and a lower insulation displacement portion 6. In operation, the terminal is substantially completely filled with sealant, preferably the sealant composition of the present invention. The terminal parts are preferably stamped from a metal having good electrical conducting qualities. These conductive qualities are desirable because transmission means, preferably two signal-carrying wires, are terminated to the terminals and the signal is carried through the terminal.

Referring now to FIG. 7, a preferred method of forming the terminal is disclosed. In particular, the terminal is stamped from a blank 2 having top bearing surfaces 34 and 40, forward surface 44, tab 45 on forward surface 44, bottom surface 42 and a recessed surface 48. Blank 2 includes an inner small wire opening 18A in tab 45, the opening 18A being in transition with an inner small wire receiving slot 20A defined by sheared surfaces 21A. Blank 2 also includes an inner large wire receiving opening 12A in transition with an inner large wire receiving slot 14A defined by sheared surfaces 15A. Strain relief slots 16A are located above and below the large wire opening 12A and large wire slot 14A. The blank 2 includes outer small wire receiving opening 18B in transition with outer small wire receiving slot 20B defined by sheared surfaces 21B, and strain relief slots 22B above and below opening 18B and slot 20B. The blank 2 includes an outer large wire receiving opening 12B in transition with an outer large wire receiving slot 14B defined by sheared surfaces 15B. Strain relief slots 16B are located above and below the opening 12B and slot 14B.

Figure 2:
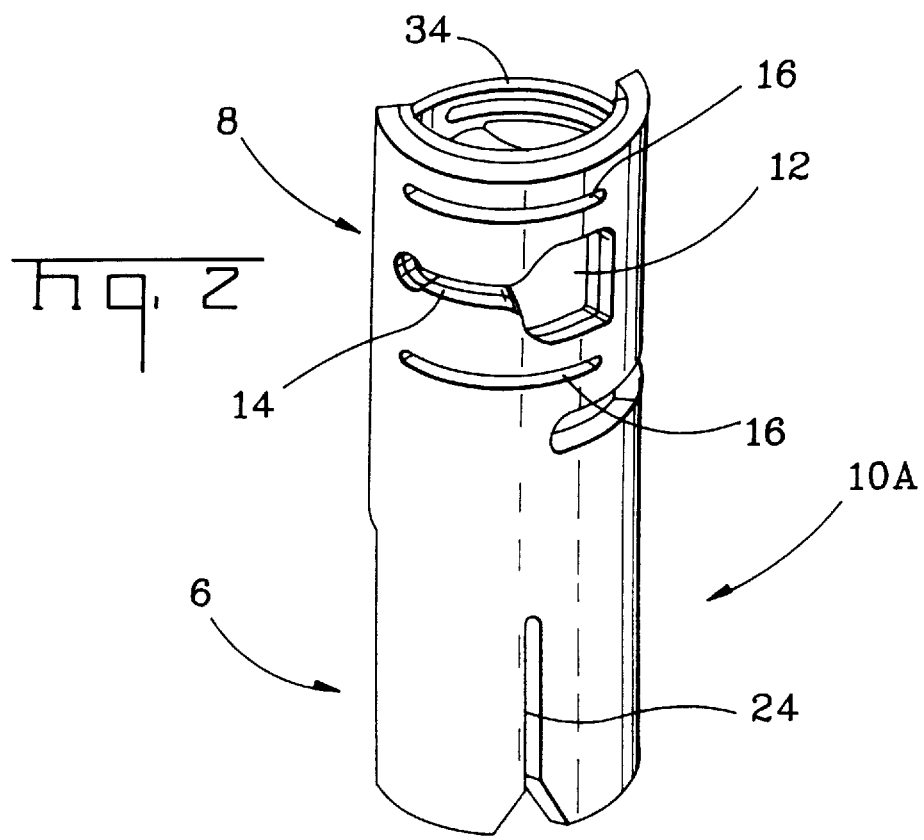
FIG. 2 is a perspective view of a connector body.
Figure 3:
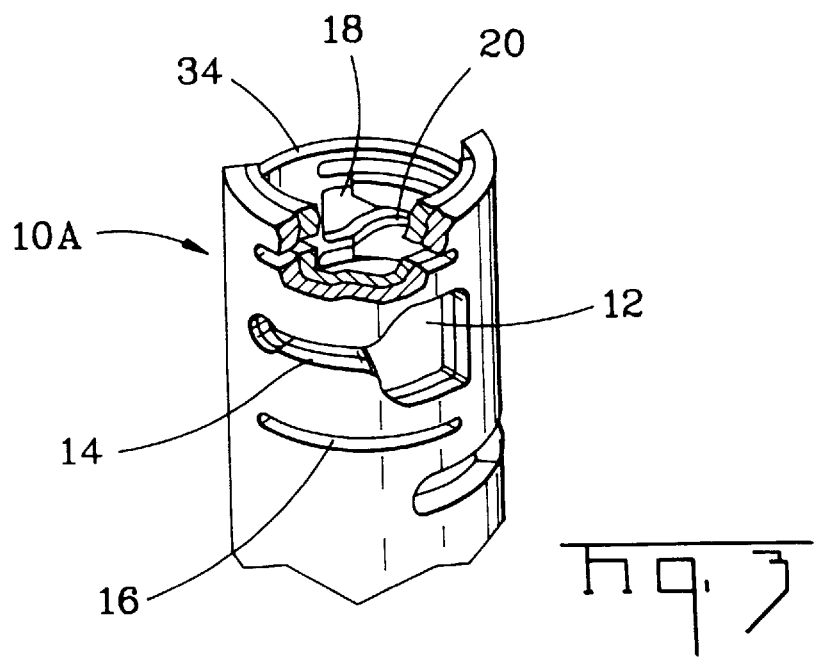
FIG. 3 is a partially cut away perspective view similar to that of FIG. 2.

The terminal 10A is formed by rolling the stamped blank of FIG. 7 into cylindrical shape, the cylinder comprising a spiraled double wall thickness as shown in FIG. 5. As best shown in FIGS. 5 and 7, the spiral begins with the end marked 18A. The spiral is then rolled clockwise around the end marked 18A until the outer small wire receiving opening 18B overlaps the inner small wire receiving opening 18A and continues around until the outer large wire receiving opening 12B overlaps the inner large wire receiving opening 12A. As overlapped, the outer large wire strain relief slots 16B also overlap the large strain relief slots 16A. When completely rolled, the terminal is a cylinder having an inner and outer wall of twice the thickness of the metal stamping and having diametrically opposed large and small wire receiving holes, 12 and 18, respectively, as best shown in FIG. 2. The terminal 10A thus includes first access means comprising inner and outer small wire openings 18A and 18B, respectively and second access means comprising large wire inner and outer openings 12A and 12B, respectively.

The blank 2 further includes lower insulation displacement slots 24, and cap detention slots 86A and 86B.

Figure 8:
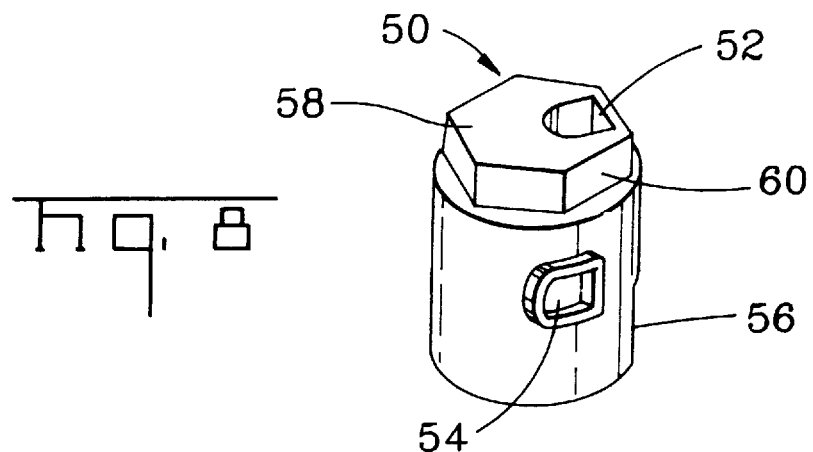
FIG. 8 is a perspective view of the terminating cap.
Figure 11:
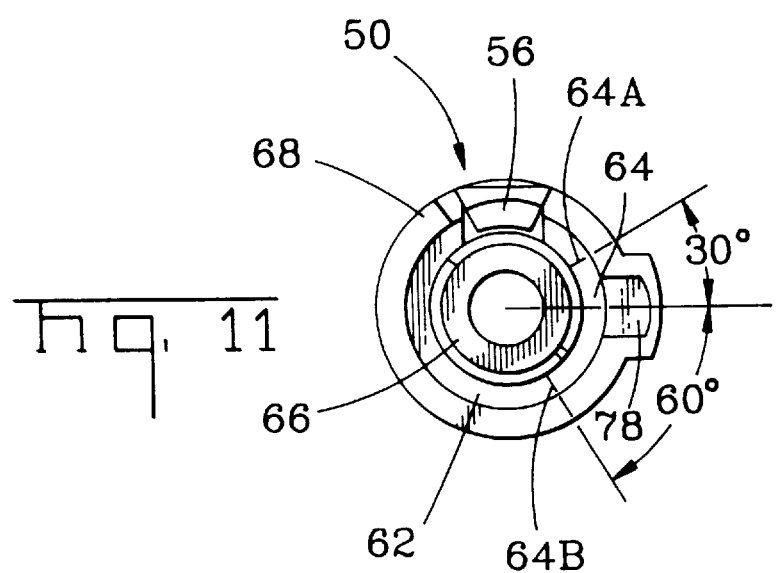
FIG. 11 is a bottom view of the terminating cap.

Referring now to FIGS. 8–11, the connector 10 includes a terminating cap 50, which cooperates with terminal 10A and substantially closes the top end of connector 10. Cap 50 is molded from a dielectric material and includes an outer wall 68 and an inner wall 66 interconnected by a top wall 58, the inner and outer walls 66,68 thereby defining an inner annular channel 62 therebetween. As shown in FIG. 11, cap 50 further comprises rotational lug 64 having surfaces 64A and 64B, detent latch member 56 and small wire receiving channel 78. As shown in FIG. 8, the cap 50 includes hexagonal nut portion 60, continuity test hole 52 and wire entry hole 54. In typical configurations, the hexagonal nut portion 60 rises so as to allow the terminal 10A to accommodate additional sealant material, thereby improving the overall quality of the connection. Wire entry hole 54 comprises large wire entry portion 54A and small wire entry portion 54B, these portions being connected by a frusto-conical transition section defined by surface 76.

Referring now to FIG. 11, it is seen that inner circular wall 66 and outer circular wall 68 of cap 50 define inner channel 62, which is so dimensioned as to be slidably received over the top of terminal 10A; that is, the outer diameter of inner wall 66 is less than the inner diameter of terminal 10A, while the inner diameter of outer wall 68 is greater than the outer diameter of terminal 10A. When cap 50 is received over terminal 10A, wire receiving opening 54 in cap 50 is aligned with large wire receiving opening 12 and opposed small wire receiving opening 18 in terminal 10A. Rotating cap 50 clockwise about a quarter turn aligns wire receiving hole 54 in cap 50 with the large wire receiving slot 14 and diametrically opposed small wire receiving slot 20. In fully assembled form, the wire receiving openings 12 and 18 and the opening 54 in cap 50 individually and together constitute connector body access openings.

Although the cap 50 and terminal 10A are rotatable with respect to one another, the angle through which the cap 50 may rotate is fixed, because as best shown in FIGS. 5 and 6, the terminal has rotational stops 32A and 32B, and the cap in turn, as shown in FIG. 11, has a rotational stop lug 64, having surfaces 64A and 64B. When the cap 50 is received over terminal 10A such that the wire opening hole 54 in the cap 50 aligns with wire opening holes 12 and 18, surface 64B of lug 64 is against surface 32B of terminal 10A, and when the cap is rotated, the rotation is limited by surface 64A of lug 64 against surface 32A of terminal 10A. Thus, the angle of rotation is defined by the angle of surface 34 as defined by surfaces 32A and 32B, less the included angle of lug 64, as defined by surfaces 64A and 64B, and is the angle required to terminate either the small wire or the large wire in the upper insulation displacement portion 8.

If a small wire is to be terminated, the small wire is placed in hole 54 and extends through sections 54A, 54B and 54C, also passing through large wire receiving opening 12, and then through small wire receiving opening 18 and into channel 78. When the cap is rotated relative to the terminal, the wire is carried in the channel, and the side wall of channel 78 forces the conductor into the small wire terminating slot 20, and the small wire makes electrical and mechanical contact with sheared surfaces 21A and 21B at three points, because the width of at least inner slot 20A is slightly smaller than the diameter of the small wire conductor. The small wire is also rotated into slot 14, and the insulation of the small wire is gripped by slot 14, which acts as a strain relief. Conversely, when a large wire is placed in hole 54, the large wire passes through the large wire receiving opening 12 but then is precluded from entering section 54B, and remains in section 54C, bearing against frustoconical surface 76. When the cap is rotated relative to the terminal, the large wire is carried within hole 54 and the large wire is forced into the large wire receiving slot 14 and the large wire makes electrical and mechanical contact with sheared surfaces 15A and 15B at three points, because the width of at least inner slot 14A is slightly smaller than the diameter of the large wire conductor.

Figure 8A:
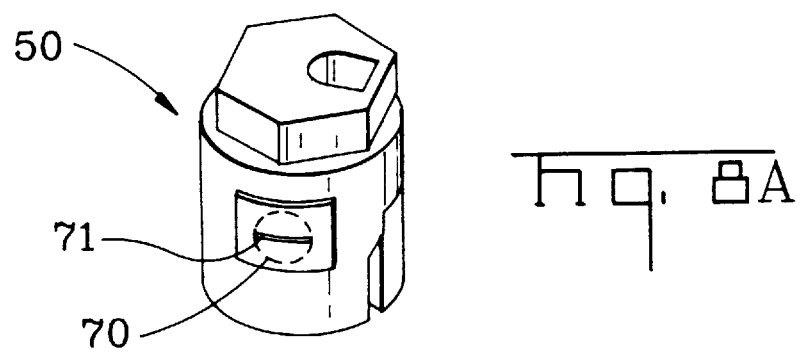
FIG. 8A is a perspective view of the terminating cap showing an embodiment including wiping means.
Figure 9:
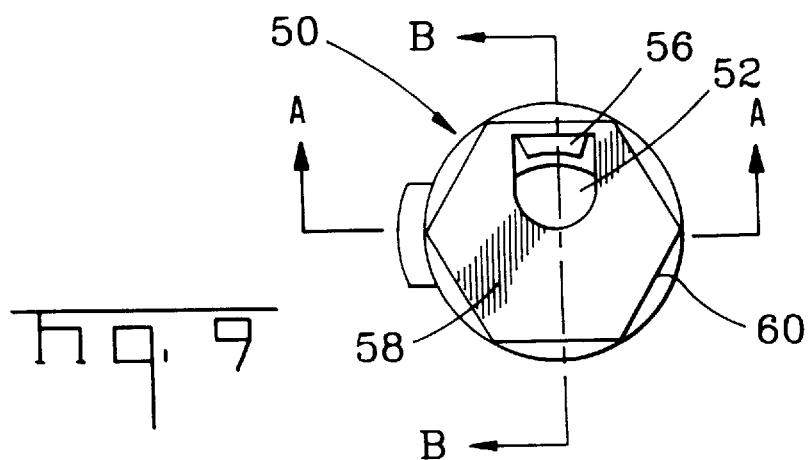
FIG. 9 is a top view of the terminating cap.
Figure 10:
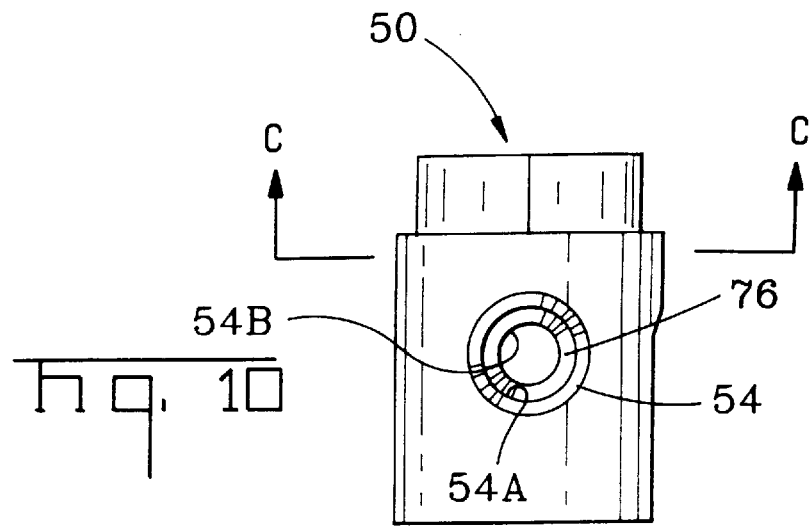
FIG. 10 is a side view of the terminating cap.

According to preferred embodiments of the present invention, one or more of the access openings 12, 18 and 54 are covered by a thin resilient film having a narrow slit or opening therein. As illustrated in FIG. 8A, for example, access opening 54 is covered by a thin resilient film 70 having a narrow slit 71 therein. The wiper means according to such embodiments preferably comprises thin polyurethane tape adhered to the terminal.

Another type of cap block for interconnecting a pair of wires is disclosed in U.S. Pat. No. 5,006,077, which is incorporated herein by reference and with which the present invention may be used. A tubular dielectric housing has a center post therein defining an annular cavity. A stationary tubular terminal is affixed within the cavity adjacent the center post; a rotatable tubular terminal is disposed within the cavity concentrically around the stationary terminal and in electrical engagement therewith at all times; and a lug-capped tubular actuator is also mounted to the housing and is adapted to be rotated between actuated and unactuated positions to rotate the rotatable terminal. A pair of wire-receiving apertures extend through apertures through the housing wall, through apertures of both terminals and the actuator, and at least into a center post aperture, all aligned in an unactuated state for a wire end to be inserted thereunto. Preferably the terminal block would have a thin resilient slit film over the wire-receiving apertures through the housing wall. Further, the probe opening through the actuator lug could be deepened to provide for sealant to move thereunto upon wire insertion. Upon rotation of the rotatable terminal by the actuator, slot walls of the terminal pierce the wire insulation and engage the wire's conductor. The stationary terminal includes a contact section extending outwardly from the housing including insulation displacement slots for a wire to be inserted thereunto and terminated, for a multi-conductor stub cable length to be secured to the enclosure containing a plurality of the terminal blocks, thus defining a cable harness. The two terminal members thus interconnect an appropriate conductor of the stub cable to a wire inserted into the terminal block. A second set of wire-receiving apertures can be utilized to receive a second inserted wire end to be interconnected with the first and with the stub cable connector.

Yet another type of terminal block is disclosed in U.S. patent application Ser. No 07/708,405 filed May 31, 1991, which is incorporated herein by reference and which is assigned to the assignee hereof. Disclosed therein is a terminal block having a single-piece terminal with connecting sections for two wires to be spliced, which are of the insulation piercing or displacement type which eliminates the need for stripping the insulation from the signal wire conductors. A dielectric housing includes an integrally molded center post within a tubular terminal-receiving housing section, both coextending from a common base section and defining an annular cavity, the housing section providing wire-receiving openings through side walls and into the cavity aligned with an aperture through the center post, enabling insertion of wire ends during splicing. A barrel terminal and an associated lug-capped tubular actuator is then assembled to the housing, with the barrel terminal surrounding the center post within the cavity and having apertured insulation displacement contact sections which are initially aligned with the wire-receiving openings of the housing and center post, and the actuator also having profiled apertures therethrough extending partially around the circumference and also aligned with the wire-receiving openings of the housing, center post and terminal. The lug extends above the housing upon assembly to be accessible to tooling for rotation thereof to rotate the actuator and the terminal. Again the probe opening the actuator lug can be deep, and a film can cover the wire-receiving openings of the housing side wall. During splicing the wire ends of both wires are inserted into respective openings and through the apertured contact sections until stopped by abutment with corresponding stop surfaces of the housing which then holds the wire ends at two spaced locations, both outside and within the terminal wall; the actuator is then rotated thus rotating the terminal forcing the wire slot edges to pierce the wire insulation of both wires and electrically connect with the conductors therein.

B. Second Embodiment

While the first embodiment described above provides especially preferred reusable electrical connectors, it is contemplated that electrical connectors according to other configurations are adaptable for use with the present sealant compositions. For example, a second embodiment provides a single use electrical connector, as illustrated in FIGS. 12–14. Connectors of this type are also disclosed in U.S. Pat. No. 3,410,950—Freudenberg, in U.S. Pat. No. 4,714,801—Koblitz et al., and in U.S. Pat. No. 5,004,869—Koblitz et al., each of which is incorporated herein by reference and assigned to the assignee of the present invention. These connectors are available from AMP Incorporated under the trade designation "Picabond."

With particular reference now to FIGS. 12–14, a connector comprising a connector 10 having transmission terminating means 16 is disclosed. The connector is comprised of an outer insulating film 14, an open U-type metal terminal 16 having a plurality of wire-receiving projections 18 extending from inner surface 16A of terminal 16. Sealing material 12, and preferably the sealing composition of the present invention, is dispensed into the connector body 10 and in this particular embodiment it is deposited on the terminal 16, particularly in the areas of projections 18. Connector 10 further has an inner insulating film layer 20 therein which extends over the sealant 12 and projections 18. Film layer 20 is sealed, preferably by means of heat, to the sides of the terminal 16 thus encasing the sealant material.

In using the connector 10, means for transmitting electrical current or signals, such as wires 22, are inserted from opposite ends of the connector 10 and disposed in the area of projections 18. As is shown in FIGS. 12 and 13, the wires 22 lie on top of the inner film layer 20. FIG. 14 shows a cross-section of the crimped connector 10. Crimping of connector 10 generally requires exertion of force on the side walls 16B of the terminal 16 sufficient to deform the terminal into a position similar to the one shown in FIG. 14, thereby forcing the wires 22 into receiving slots 24 of projections 18. Slots 24 are narrower than the diameter of the conductors within wires 22 for side edges of slots 24 to pierce the insulation surrounding the conductors to establish electrical connections therewith. For the purpose of convenience, the force required to produce such a deformation is referred to herein as the normal crimping force. As will be understood by those skilled in the art, the magnitude of this force will vary somewhat depending upon several factors, including connector design and size. During the crimping of the connector 10, wires 22 rupture the film layer as they are forced into receiving slots 24 of projection 18. As a result of the pressure exerted by the normal crimping force, sealant 12 of the present invention is deformed as it is forced through the breach in the film layer 20 and surrounds the intersections of the wires and the projection, thereby sealing the immediate contact areas between the wires and the connector.

III. THE METHODS

It is contemplated that, in view of the information contained herein, compositions according to the present invention may be readily prepared using known techniques. Nevertheless, it is preferred that the present compositions be prepared according to the methods described herein in order to obtain compositions well adapted for use as sealants.

The methods of the present invention generally comprise the step of providing a solution, dispersion and/or emulsion of the elastomeric thermoplastic polymer in the extender, and raising said solution, dispersion or emulsion to at least about the gelation initiation temperature of the polymer/extender mixture, and even more preferably to at least about the fusion temperature of the polymer/extender mixture. As is well known to those skilled in the art, the application of heat to polymer/extender mixtures of the type disclosed herein generally causes physical changes in the rheology of the mixture. Without intending to be bound by or limited to any particular theory, it is believed that upon the application of heat to the solutions, dispersions or emulsions of the present invention, the extender portion thereof begins to become solvated in the polymer while fractions of the polymer dissolve in the extender. As additional heat is applied to the composition, continued solvation of the extender and the polymer results in a substantial increase in viscosity and a corresponding loss of composition fluidity. This increase in viscosity and loss of fluidity is generally associated with the onset of the "gelation" of the composition. It will be appreciated by those skilled in the art that as the temperature is raised from about room temperature to about the onset of gelation, the fluid polymer/extender compositions of the present invention may first exhibit an initial decrease in viscosity, followed by the gradual increase in viscosity described above. Upon application of further heat and a further increase in temperature, a peak in viscosity is reached, and thereafter the present compositions exhibit increasing fluency as the gel becomes liquid-like. For the purposes of convenience, the term "gelation temperature range" is used herein to refer to the range of temperature spanning from about the initial increase in composition viscosity to about the end of the peak in viscosity. Techniques are well known and available to those skilled in the art for determining the onset of gelation of any particular polymer/extender composition. For example, the onset of gelation may be measured using a gelation plate which is heated only at one end, thereby developing a temperature gradient from one end of the plate to the other. When a polymer composite/extender composition is cast onto the plate, the—temperature of the plate at the point the composition begins to lose its fluidity is referred to herein as the composition's initial gelation temperature. The temperature at which the composition begins to regain fluidity is referred to herein as the gelation end point. It will be appreciated that these terms are used for the purposes of convenience, but not by way of limitation.

The gelation temperature range of any particular composition is a function of many variables, including the type and relative amounts of extender and polymer material present. It is generally contemplated, however, that gelation of the present compositions will take place at temperatures of from about 125° C. to about 200° C. with sufficient time. As additional heat is applied to the composition, incorporation of the extender into the polymer domains occurs and the composition becomes liquid-like. In particular, heating of the present compositions for a time sufficiently beyond the gelation end point causes the extender molecules to become fully incorporated into the matrix of the polymer molecules, and the extender becomes substantially integrated into the polymer network. In such a state, the composition is said to be a fused liquid-like composition. According to certain embodiments, the completion of gelation is determined by monitoring the torque required by the mixer over time and noting the approximate peak torque thereof and its elapsed time.

Certain embodiments of the present methods preferably also comprise the important step of incorporating a crosslinkable polymer into the thermoplastic elastomer/extender mixture. It is especially preferred that such an incorporating step comprise incorporating precursors for said crosslinkable polymer into a fluid composition comprising said thermoplastic elastomer and then crosslinking said polymer precursors in the presence of said thermoplastic elastomer. It is contemplated that the step of incorporating the crosslinked polymer precursors into the composition can occur, before, during and/or after the heating step described above. It is preferred, however, that the polymer precursors be added to the mixture after the initiation of gelation of the organic polymer/extender mixture, more preferably after the gelation end point is reached, and even more preferably after liquification of the organic polymer/extender composition.

It is contemplated that the step of crosslinking the precursors in the presence of the thermoplastic elastomer may utilize any one of several well-known techniques, and all such techniques are within the scope of the present invention. For embodiments in which the crosslinkable polymer comprises cross-linkable silicon based polymer, it is preferred that the polymer precursor comprise first and second functionalized silicon-based polymers wherein said first polymer is a hydrosilicon functionalized silicon-based polymer and said second polymer is a vinyl functionalized silicon-based polymer. In such embodiments, the crosslinking step comprises introducing said first and second polymer precursors into the thermoplastic elastomer/extender mixture during the heating thereof. It is also preferred that the crosslinking step comprise introducing a cross-linking catalyst, and preferably a platinum crosslinking catalyst, into the mixture before, during or after the introduction of said polymer precursors.

The examples which follow are illustrative but not limiting of the present invention.

IV. EXAMPLES

Example 1

POLYMER MELT VISCOSITIES AND GELLING CAPACITY

The melt viscosity of each of a series of thermoplastic elastomeric polymers in accordance with the present invention was determined by stirring 5 parts by weight (pbw) of the polymer in 95 pbw of Kaydol mineral oil at 150° C. until substantially homogeneous. The Kaydol mineral oil is sold by Witco and has a kinematic viscosity of about 65–70 centistokes at 40° C., a specific gravity of about 0.87–0.89 at 25° C. and a pour point as measured by ASTM D97 of about −18° C. The ability of each polymer to form a gelled network at 75° C. with Kaydol at the indicated concentration was also evaluated. The results are reported in Table 1 below.

TABLE 1

Melt Viscosities and Gellability

| POLYMER | Kraton 1701X | Kraton 1650 | Kraton 1652 | Kraton 1651X | Kraton 1654 x |
|---|---|---|---|---|---|
| Brookfield 150° C. | 108 | 35 | 26 | 44,000 | 14,120 |
| Brookfield 125° C. | 107 | 41 | 34 | 290,000 | 132,000 |
| Brookfield 100° C. | 384 | 99 | 51 | 1,464,000 | 370,000 |
| Brookfield 75° C. | 1,200 | 33,200 | 122 | Gelled | Gelled |

As can be seen from the results reported in Table 1, Kraton 1650, 1652 and 1701X are low molecular weight polymers, each having a melt viscosity of about 100 cps or less. In contrast, Kraton 1651X and 1654X are high molecular weight polymers, each having a melt viscosity of greater than 10,000 cps. In addition, Kraton 1651X and 1654X have the ability to gel with Kaydol at above about 75° C., whereas the low molecular weight polymers do not possess this ability. Accordingly, the two high molecular weight polymers are secondary polymers and the low molecular weight polymers are primary polymers.

Example 2A

PRIMARY POLYMER SWELLING PERCENTAGE

A series of extenders were evaluated to determine swelling percentage in the primary polymer Kraton 1701X. Swelling percentage was measured by adding 1 gram of Kraton 1701X to a beaker of the designated extender and allowing the polymer to swell for 24 hours at 60° C. The amount of extender absorbed into the polymer is reported in Table 2A as the swelling percentage.

TABLE 2A

Swelling of Kraton 1701X by Extenders

| Extender | % Weight Gained |
|---|---|
| Kaydol | 1299.00 |
| Isopar G | Dissolved |
| Isopar M | *1031 |
| Panalane L14 | 1376.00 |
| Shellflex 371 | 1441.00 |
| DB Castor Oil | 369.00 |
| Indopol H100 | 1121.00 |
| Indopol H300 | 841.00 |
| 50ISOG/50H100 | *855 |
| 40Kaydol/40H100/20ISOG | *1196 |

*Slight Sample Dissolution;
50 ISOG/50H100 is 50/50 pbw Isopar G and Indopol H100;
40K/40H100/20ISOG is 40/40/20 pbw Kaydol, Indopol H100 and Isopar G.

As can be seen from the data in Table 2A, the ability of various extenders to swell the primary extender Kraton 1701X varies from a low of about 370% in the case of DB Castor Oil to a high of about 1450% in the case of Shellflex 371. Applicants have also surprisingly found that the extender Isopar G is capable of dissolving such primary polymers. Furthermore, applicants have observed that mixtures of extenders which include Isopar G also exhibit at least some dissolution of the polymer.

Example 2B

SECONDARY POLYMER SWELLING PERCENTAGE AND

EXTENDER EVAPORATION RATES

A series of extenders were evaluated to determine swelling percentage in the secondary polymers Kraton 1651X and 1654X. Swelling percentage was measured by adding 1 gram of the designated polymer to a beaker of the designated extender and allowing the polymer to swell for 24 hours at 60° C. The amount of extender absorbed into the polymer is reported in Table 2B as the swelling percentage in terms of percentage weight gain. Because of its lower volatility and potentially improved oil retention, Isopar M was substituted for Isopar G when tested with Kraton 1651X. Table 2B also provides information on the evaporation rates of the various extenders in neat form.

TABLE 2B

Swelling of Secondary Polymers by Extenders and Extender Evaporation Rates

| Polymer | Extender | % Weight Gained | Evaporation** |
|---|---|---|---|
| Kraton G1651X | | | |
| 1651 | Kaydol | 934 | 3.5 |
| 1651 | Shellflex 371 | 1211 | 7.2 |
| 1651 | Panalane L14E | 919 | |
| 1651 | Panalane H300E | 729 | |
| 1651 | Isopar M | 2029 | |
| 1651 | Indopol H100 | 700 | 6.4 |
| 1651 | Synton PAO-100 | 445 | 0.1 |
| 1651 | Emery 2900 | 554 | 0.4 |
| 1651 | Trilene CP4038 | ≈600 | 0.0 |
| Kraton G1654X | | | |
| 1654 | Kaydol | 930.00 | 3.5 |
| 1654 | Shellflex 371 | 1931.00 | 7.2 |
| 1654 | PanalaneL14E | 1747 | |
| 1654 | Indopol H100 | 680 | 6.4 |
| 1654 | Isopar G | 1918.00 | |

*Partial dissolution
**wt. % loss @ 150° for 24 hours
Synton PAO-100 is a poly-alpha-olefin oil from Uniroyal Chemical Co.;
Emery 2900 is a dimer acid ester oil from Emery Chemicals;
Trilene CP4038 is an ethylene-propylene liquid EPDM rubber from Uniroyal Chemical Co.

As can be seen from Table 2B above, Panalane H300E and Indopol H100 have a secondary swelling percentage of less than about 900%, while Shellflex 371, Isopar M, Isopar G, Panalane L14E and Kaydol have a secondary swelling percentage of at least about 900. Furthermore, it is seen that Shellflex 371, Isopar G and Isopar M exhibit secondary swelling percentages more than twice the percentage exhibited by Indopol H100.

As described above and as illustrated by the following examples, applicants have found that the use of extenders having a secondary swelling percentage of greater than about 700, more preferably greater than about 900%, and even more preferably of greater than about 1,200%, produces sealant compositions having enhanced low temperature properties.

Examples 3–7

Sealant compositions in accordance with several embodiments of the present invention were prepared using components in the amounts (in pbw) indicated in Table 3. Each sealant composition was prepared by introducing the extender component at about room temperature into a mixing vessel provided with a heating source. The extender was heated to about 75°–80° F. for about 15–20 minutes. The indicated thermoplastic elastomers were then added to the mixing vessel and mixing was continued for about 15–20 minutes at a temperature of about 75°–80° to produce a dispersion. Antioxidants and thermal stabilizers were then added to the mixture. The mixture was maintained at a temperature of about 375° F. and stirring was continued for about an additional 120 minutes, at which point any additional ingredients, such as corrosion inhibitor, fungicide and surfactant were added to the mixing vessel. The mixture was maintained at an elevated temperature (375°–420° F.) with continual stirring for about an additional 120 minutes. The contents of the vessel were then cooled to about room temperature to produce a sealant composition. Each of the sealants thus produced was tested to determine the physical property listed in Table 3.

The composition of Example 3 comprises an extender consisting of Indopol H-100, which has a secondary swelling percentage of less than about 700%, and Kaydol, which has a secondary swelling percentage of about 900%. It should also be noted that the thermoplastic elastomer used in this example was a composite comprising primary polymer and secondary polymer in a 10:1 ratio. Although this sealant exhibited excellent slump resistance and oil retention at high temperatures (80° C.), and high memory at low temperatures (−22° C.), it exhibited marginal performance in other respects. For example, while this sealant composition had cohesive strengths that were within certain of the preferred ranges in accordance with the present invention, it nevertheless produced residue that was undesirably greasy. More importantly, however, the low temperature wire insertability of the sealant in accordance with Example 3 was 80, a value which applicants have found to be marginal with respect to the ability to effectively and economically conduct low temperature field repair or reuse of the connectors.

In contrast to Example 3, Example 4 comprised an extender consisting of about 36 wt. % Kaydol, about 29 wt. % Panalane L14E and about 36 wt. % Shellflex 371. Thus, about 36% by weight of the extender in Example 4 had a secondary swelling percentage of substantially greater than about 1000%. In other respects, however, the sealant of Example 4 included substantially the same components in substantially the same amounts as Example 3. However, the sealant of Example 4 did not produce a greasy residue upon wire removal at either 23° C. or −22° C. Even more importantly, the wire insertability of the sealant of Example 4 was greater than about 100 (estimated at 120) at −22° C. This example illustrates, especially in comparison to Example 3, that the use of an extender having a secondary swelling percentage greater than about 1000 in an amount of at least about 35% significantly and unexpectedly improves the low temperature wire insertability of the sealant produced.

The sealant of Example 5 is another illustration of a sealant in accordance with the present invention having superior low temperature wire insertability. The Example 5 sealant comprised an extender consisting of about 22% of each of Indopol H-100, Panalane L14E and Isopar M, and about 33% by weight of Shellflex 371. Thus, the extender of Example 5 contained about 56% by weight of extender having a secondary swelling percentage of greater than about 1000%, and more particularly of about 1200% or greater (i.e., Shellflex 371 and Isopar M). Not only did this sealant exhibit excellent high temperature slump resistance and oil retention, it showed improvement relative to Examples 3 and 4 in cohesive strength. With respect to low temperature wire insertability, a value of about 130 was observed. This was an improvement over the sealants of Examples 3 and 4.

Examples 6 and 7 provide further illustration of the importance of extenders having a high secondary swelling percentage in accordance with the preferred aspects of the present invention. More particularly, the sealant in each of these examples consisted of Shellflex 371 and Isopar M, each of which have a secondary swelling percentage of about 1200% or greater. In addition, these sealants had an increased level of secondary polymer (primary:secondary polymer ratio of 4:1). Even with the increased levels of secondary polymer used in these examples, the wire insertability values for these sealants at about −22° C. were 185 and 165, respectively. Such results are truly exceptional, especially in comparison to the sealant of Example 3. Moreover, each of these sealants retained excellent high temperature properties, such as slump resistance and oil retention.

Example 9 illustrates a preferred sealant having excellent high temperature slump resistance, superior low temperature wire insertability and desirably low evaporation rates. More specifically, the use of Kaydol and Shellflex 371 as the high secondary swelling percentage extenders produced a sealant with an evaporation rate of 3.4% at 24 hours in a 150° C. Although examples 4 and 5 produced comparable results in terms of low temperature wire insertability and slump resistance, each of these examples produced a sealant having an evaporation rate that is undesirably high for certain embodiments.

TABLE 3

| Example Number | 3 | 4 | 5 | 6 | 7 | 8 | 9 |
|---|---|---|---|---|---|---|---|
| EXTENDER | | | | | | | |
| AC9X | | | | | | | |
| Indopol H-100 | 45 | | 20 | | | 25 | 20 |
| Kaydol | 45 | 25 | | | | | 35 |
| Shellflex 371 | | 25 | 30 | 45 | 45 | 25 | 35 |
| Panalane L14E | | 20 | 20 | | | 20 | |
| Isopar M | | | 20 | 45 | 45 | | |

TABLE 3-continued

| Example Number | 3 | 4 | 5 | 6 | 7 | 8 | 9 |
|---|---|---|---|---|---|---|---|
| PRIMARY POLYMER | | | | | | | |
| G1652 | | | 3.75 | | | | |
| G1701X | 7.5 | 7.5 | 3.75 | 8 | 8 | 7.50 | 7.5 |
| SECONDARY POLYMER | | | | | | | |
| G1651X | 0.75 | 0.75 | 0.75 | | 2 | 0.75 | 1.0 |
| 1654X | | | | 2 | | | |
| MINOR INGREDIENTS | .115 | .50 | .50 | | | | 1.5 |
| RATIOS | | | | | | | |
| PRIMARY: SECONDARY POLYMERS | 10:1 | 10:1 | 10:1 | 4:1 | 4:1 | 10:1 | 7.5:1 |
| PROPERTIES | | | | | | | |
| Appearance | clear | clear elast. gel | clear elast. gel | | | | |
| Cone pen at 23° C. | 295 | 270 | 280 | 270 | 270 | 270 | 299 |
| Cone pen at −22° C. | 205 | 186 | 225 | 230 | 235 | 185 | 217 |
| Softening point | 106 | N/A | ≈100 | N/A | N/A | N/A | N/A |
| Melt flow | 2.3 | N/A | ≈3.5 | N/A | N/A | N/A | N/A |
| Pour point | 200 | N/A | ≈200 | N/A | N/A | N/A | ≈200 |
| Slump test at 80° C. | 0.0 | 0 | 0 | 0.5(est) | 0.5(est) | 0.5 (est) | ≈0 |
| Melt viscosity @ 175° C. | 1,208,000 | N/A | N/A | N/A | N/A | N/A | 35,000 |
| Oil Retention 80° C. | 100 | 100 | 100 | 100 | 100 | 100 | 100 |
| Memory at −22° C. | >500 | >500 | >500 | >500 | >500 | >500 | >500 |
| Cohesive at 23° C. | <0.01 greasy | <0.01 | <0.001 (0) | 0 | 0 | 0 | 0 |
| Cohesive at −22° C. | <0.01 greasy | <0.01 | <0.001 (0) | 0 | 0 | 0 | 0 |
| Adhesive at 23° C. | 15 | v. low | 40 | 65 | 75 | 20 | 18 |
| Adhesive at −22° C. | 125 (120) | v. low | 100 (130) | 150 | 175 | 120 | 120 |
| Wire insert at 23° C. | 376 (380) | >380 | 255 | 230 | 285 | 370 | 442 |
| Wire insert at −22° C. | 80 | >100(120 est) | 120 | 185 | 165 | 85 | 123 |

What is claimed is:

1. A moisture and temperature resistant electrical connector for sealingly connecting transmission means comprising:

(a) a connector body comprising terminal means for accepting and electrically connecting with said transmission means; and (b) a sealing and lubricating composition disposed along or adjacent to said terminal means for providing low-temperature sealing and wire-insertability to the connector, said composition comprising an elastomeric thermoplastic polymer, said elastomeric thermoplastic polymer being elastomeric at temperatures of from about −40° C. to at least about +150° C. and flowable yet thermally stable at temperatures of from about +200° C., said elastomeric thermoplastic polymer comprising at least one elastomeric block and one non-elastomeric block, and said elastomeric thermoplastic polymer comprising a composite of a first elastomeric thermoplastic polymer and a second elastomeric thermoplastic polymer, the melt viscosity of said second elastomeric thermoplastic polymer being at least about 50 times greater than the melt viscosity of said first elastomeric thermoplastic polymer, and an extender for said polymer, said extender comprising a major proportion by weight of said composition and said extender comprising an extender having a secondary swelling percentage at about 60° C. of at least about 700% in a poly(styrene-ethylene-butylene-styrene) tri-block copolymer, wherein said composition has a slump resistance at about 80° C. of less than about 0.5 inches, a low-temperature cohesive strength at about −22° C. of no greater than about 0.01 g and a low-temperature wire insertability at about −22° C. of no less than about 80×0.1 mm.

2. The connector of claim 1 wherein the weight ratio of said extender to said polymer is in the range of about 99:0.5 to 85:15.

3. The connector of claim 1 wherein said extender comprises at least about 35% by weight of extender having a secondary swelling percentage at about 60° C. of at least about 900% in a ploy (styrene-ethylene-butylene-styrene) tri-block copolymer.

4. The connector of claim 3 wherein said extender comprises a mixture of extenders, at least about 50% by weight said extenders having a secondary swelling percentage at 60° C. of at least about 1200% in a poly (styrene-ethylene-butylene-styrene) tri-block copolymer.

5. The connector of claim 1 wherein said extender comprises a C2–C12 polyolefin.

6. The connector of claim 2 wherein said extender comprises extender selected from the group consisting of polybutadiene, polybutene, polybutylene, hydrocarbon resins, atactic polypropylene, branched polyethylene, ethylene-propylene copolymers and low molecular weight styrenic polymers and combinations and copolymers of these.

7. The connector of claim 1 wherein said extender comprises extender selected from the group consisting of naphthenic oils, aliphatic oils and solvents, white oils, terpenoid hydrocarbons and combinations of these.

8. The connector of claim 1 wherein said extender consists essentially of synthetic oil having a molecular weight of from about 250 to about 450 and comprising from about 40% to about 60% of paraffinic carbon atoms, from about 35% to about 60% naphthenic carbon atoms, and about 1% to about 10% aromatic carbon atoms, said aromatic carbon atoms not including carbon atoms which are members of naphthenic rings.

9. The connector of claim 1 wherein said elastomeric, thermoplastic polymer comprises primary polymer and secondary polymer, said secondary polymer having a melt viscosity of at least about 10,000 cps, the melt viscosity being measured at about 150° C.

10. The connector of claim 9 wherein the primary polymer comprises di-block copolymer.

11. The connector of claim 10 wherein said di-block copolymer comprises a block of non-elastomeric polymer connected to a block of elastomeric polymer, said non-elastomeric polymer block being selected from the group consisting of poly(alkenyl arenes), polyurethanes and combinations of these, and said elastomeric polymer block being selected from the group consisting of non-aromatic polyolefins, polyesters, polyethers and combinations of these.

12. The connector of claim 10 wherein said secondary polymer block comprises tri-block copolymer.

13. The connector of claim 12 wherein said tri-block copolymer comprises a block of non-elastomeric polymer connected to a block of elastomeric polymer, said block of elastomeric polymer being connected to another block of non-elastomeric polymer, said non-elastomeric polymer block being selected from the group consisting of poly (alkenyl arenes), polyurethanes and combinations of these, and said elastomeric polymer block being selected from the group consisting of non-aromatic polyolefins, polyesters, polyethers and combinations of these.

14. A moisture and temperature resistant electrical connector for sealingly connecting transmission means comprising:
   (a) a connector body; and
   (b) a sealant composition disposed in said connector body, said sealant composition comprising:
      (i) a minor proportion by weight of an elastomeric thermoplastic polymer, said elastomeric thermoplastic polymer being elastomeric at ambient temperatures and flowable yet thermally stable at elevated temperatures, said elastomeric thermoplastic polymer comprising at least one elastomeric block and one non-elastomeric block, and said elastomeric thermoplastic polymer comprising a composite of a first elastomeric thermoplastic polymer and a second elastomeric thermoplastic polymer, the melt viscosity of said second elastomeric thermoplastic polymer being at least about 50 times greater than the melt viscosity of said first elastomeric thermoplastic polymer; and
      (ii) a major proportion by weight of an extender, at least about 35% by weight of said extender having a secondary swelling percentage at about 60° C. of at least about 700% in a poly (styrene-ethylene-butylene-styrene) tri-block copolymer.

15. The connector of claim 14 wherein said connector body comprises a container having access means for allowing entry of said transmission means into said connector body and a terminal means for accepting and electrically connecting with said transmission means.

16. The connector of claim 14 wherein the weight ratio of said first polymer to said second polymer is from about 4:1 to about 20:1.

17. The connector of claim 14 wherein said sealant composition has a flow of at least about 2 gram per min. at about 160° C., a slump resistance of less than about 0.5 in. at about 80° C., and an elastic memory of at least about 200% at temperatures of from about −22° C. to about +80° C.

18. The connector of claim 17 wherein the weight ratio of said extender to said polymer is in the range of about 99:0.5 to 85:15.

19. The connector of claim 14 wherein said elastomeric thermoplastic organic polymer comprises a block copolymer blend.

20. The connector of claim 19 wherein said block copolymer comprises a di-block copolymer and a tri-block copolymer.

21. The connector of claim 14 wherein:
   (a) said extender consists essentially of extender having a swelling percentage at 60° C. of at least about 1200% in a poly (styrene-ethylene-butylene-styrene) tri-block copolymer; and
   (b) the weight ratio of said first polymer to said second polymer is 4:1.

22. The connector of claim 21 wherein said extender consists essentially of synthetic oil having a molecular weight of about 400 and comprises from about 50% to about 60% of paraffinic carbon atoms, from about 40% to about 50% naphthenic carbon atoms, and about 1% aromatic carbon atoms, said aromatic carbon atoms not including carbon atoms which are members of naphthenic rings.

* * * * *

UNITED STATES PATENT AND TRADEMARK OFFICE
CERTIFICATE OF CORRECTION

PATENT NO.   : 5,844,021
DATED        : December 1, 1998
INVENTOR(S)  : Francis Frederick Koblitz et al.

It is certified that error appears in the above-identified patent and that said Letters Patent is hereby corrected as shown below:

On the Title Page:

Item [*]  Patent No. "5,544,463" should be "5,580,265"

Item [63] Patent No. "5,544,463" should be "5,580,265"

Signed and Sealed this

Twenty-fifth Day of May, 1999

Attest:

Q. TODD DICKINSON

*Attesting Officer*       *Acting Commissioner of Patents and Trademarks*